US010528559B2

(12) United States Patent
Katakawa

(10) Patent No.: US 10,528,559 B2
(45) Date of Patent: Jan. 7, 2020

(54) INFORMATION PROCESSING SYSTEM, TERMINAL, SERVER, INFORMATION PROCESSING METHOD, RECORDING MEDIUM, AND PROGRAM

(71) Applicant: Rakuten, Inc., Tokyo (JP)

(72) Inventor: Jun Katakawa, Tokyo (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 631 days.

(21) Appl. No.: 14/904,874

(22) PCT Filed: May 28, 2014

(86) PCT No.: PCT/JP2014/064135
§ 371 (c)(1),
(2) Date: Jan. 13, 2016

(87) PCT Pub. No.: WO2015/181909
PCT Pub. Date: Dec. 3, 2015

(65) Prior Publication Data
US 2016/0203183 A1   Jul. 14, 2016

(51) Int. Cl.
*G06F 16/2453* (2019.01)
*G06F 16/248* (2019.01)
(Continued)

(52) U.S. Cl.
CPC ...... *G06F 16/24535* (2019.01); *G06F 16/248* (2019.01); *G06F 16/24542* (2019.01); *G06F 16/24578* (2019.01); *G06F 16/9535* (2019.01)

(58) Field of Classification Search
None
See application file for complete search history.

(56) References Cited

U.S. PATENT DOCUMENTS 7,657,515 B1 *  2/2010  Jewell ................. G06F 17/3066
                                                707/999.003
9,317,260 B2 *  4/2016  Balachandran ........... G06F 8/36
(Continued)

FOREIGN PATENT DOCUMENTS

JP        2012-8725 A      1/2012

OTHER PUBLICATIONS

Preston Gralla, How the Internet Works, Que Publishing, 7th edition, 2004 (Year: 2004).*
(Continued)

*Primary Examiner* — Wilson Lee
(74) *Attorney, Agent, or Firm* — Sughrue Mion, PLLC

(57) ABSTRACT

In an information processing system (1), a seller terminal (20) transmits a main query to an information processing server (10). The information processing server (10) receives the main query from the seller terminal (20), splits the main query into multiple sub queries in an order based on a sort condition, and transmits the sub queries to the seller terminal (20). The seller terminal (20) receives the multiple sub queries from the information processing server (10), and transmits the sub queries to the information processing server (10) in the specified order. When the information processing server (10) receives one of the sub queries from the seller terminal (20), the information processing server (10) searches for records satisfying the relevant sub query, and transmits searched records to the seller terminal (20). The seller terminal (20) receives the searched records, and displays the received records being arranged in the specified order. Records satisfying the sub queries are sorted according to the sort condition by the information processing server (10) or the seller terminal (20), and displayed by the seller terminal (20).

10 Claims, 19 Drawing Sheets

(51) Int. Cl.
  *G06F 16/9535* (2019.01)
  *G06F 16/2457* (2019.01)

(56) References Cited

U.S. PATENT DOCUMENTS

| | | | |
|---|---|---|---|
| 2003/0074352 A1* | 4/2003 | Raboczi | G06F 17/30545 |
| 2004/0225643 A1* | 11/2004 | Alpha | G06F 17/3064 |
| 2006/0206477 A1* | 9/2006 | Dalvi | G06F 17/30542 |
| 2006/0224603 A1* | 10/2006 | Correll | G06F 17/30545 |
| 2009/0204570 A1* | 8/2009 | Wong | G06F 16/2365 |
| 2011/0040771 A1* | 2/2011 | Gilyadov | G06F 13/385 |
| | | | 707/754 |
| 2011/0196857 A1* | 8/2011 | Chen | G06F 17/30457 |
| | | | 707/714 |
| 2011/0258212 A1* | 10/2011 | Lu | G06F 17/30864 |
| | | | 707/760 |
| 2011/0282864 A1* | 11/2011 | Collins | G06F 17/30445 |
| | | | 707/719 |
| 2011/0320451 A1 | 12/2011 | Boh et al. | |
| 2012/0005219 A1* | 1/2012 | Apacible | G06F 17/30675 |
| | | | 707/768 |
| 2014/0344298 A1* | 11/2014 | Goetsch | G06F 17/30501 |
| | | | 707/756 |
| 2015/0066910 A1* | 3/2015 | Bleach | G06F 17/30451 |
| | | | 707/722 |
| 2015/0088844 A1* | 3/2015 | Stigsen | G06F 17/30312 |
| | | | 707/703 |
| 2015/0248644 A1* | 9/2015 | Zenger | G06Q 10/105 |
| | | | 705/320 |
| 2015/0269224 A1* | 9/2015 | Kundu | G06F 17/30463 |
| | | | 707/718 |

OTHER PUBLICATIONS

International Search Report for PCT/JP2014/064135 dated Jun. 24, 2014 [PCT/ISA/210].
Written Opinion for PCT/JP2014/064135 dated Jun. 24, 2014 [PCT/ISA/237].

* cited by examiner

| PRODUCT CODE | PRODUCT NAME | STORE CODE | STOCK | SALE PRICE | ... |
|---|---|---|---|---|---|
| 12345 | FAN (MODEL NO.: XY-12) | 0001 | 200 | ... | ... |
| 23456 | REFRIGERATOR (MODEL NO.: ABCDE) | 0002 | 100 | ... | ... |
| ... | ... | ... | ... | ... | ... |

FIG.3

| ORDER TIME | BUYER ID | PRODUCT CODE | STORE CODE | QUANTITY | ... |
|---|---|---|---|---|---|
| 2014/04/25 00:01:03 | 7801247072 | 12345 | 0001 | 1 | ... |
| 2014/04/25 00:11:27 | 5728014721 | 23456 | 0002 | 1 | ... |
| ... | ... | ... | ... | ... | ... |

FIG.4

ORDER LIST SEARCH

| ORDER NUMBER | ORDER TIME | PRODUCT CODE | BUYER ID |
|---|---|---|---|
| 000001 | 2014/4/25 00:01:30 | 12345 | 7801247072 |
| 000002 | 2014/4/25 00:30:27 | 23456 | 5728014721 |
| 000003 | 2014/4/25 00:35:51 | 12345 | 3565363346 |
| 000004 | 2014/4/25 00:44:01 | 74982 | 7654322712 |
| 000005 | 2014/4/25 00:52:33 | 12345 | 6505654322 |
| 000006 | 2014/4/25 00:59:25 | 34389 | 0756765433 |
| 000007 | 2014/4/25 01:05:12 | 36897 | 6345454771 |
| 000008 | 2014/4/25 01:10:19 | 43933 | 7878657532 |
| 000009 | 2014/4/25 01:16:23 | 12345 | 7675210990 |
| 000010 | 2014/4/25 01:22:54 | 34325 | 1323843534 |
| 000011 | 2014/4/25 01:29:51 | 23413 | 0765724555 |
| 000012 | 2014/4/25 01:37:49 | 12345 | 4325608990 |
| 000013 | 2014/4/25 01:41:55 | 84554 | 0776741454 |
| 000014 | 2014/4/25 02:01:00 | 64564 | 9123756377 |
| 000015 | 2014/4/25 02:05:02 | 96454 | 1089044567 |
| 000016 | 2014/4/25 02:15:09 | 95656 | 0067711210 |
| 000017 | 2014/4/25 02:38:31 | 34235 | 0089899932 |
| 000018 | 2014/4/25 03:40:21 | 54545 | 0000742343 |

ORDER LIST SEARCH

| ORDER NUMBER | 000001 |
| --- | --- |
| ORDER TIME | 2014/4/25 00:01:30 |
| PRODUCT CODE | 12345 |
| BUYER ID | 7801247072 |
| ADDRESS | ... |
| NAME | ... |
| PHONE NUMBER | ... |
| ... | ... |

[SEARCH PURCHASE HISTORY]

FIG.10

ORDER LIST SEARCH

| ORDER NUMBER | ORDER TIME | PRODUCT CODE | BUYER ID |
|---|---|---|---|
| 000001 | 2014/4/25 00:01:30 | 12345 | 7801247072 |
| 000002 | 2014/4/25 00:30:27 | 23456 | 5728014721 |
| 000003 | 2014/4/25 00:35:51 | 12345 | 3565363346 |
| 000004 | 2014/4/25 00:44:01 | 74982 | 7654322712 |
| 000005 | 2014/4/25 00:52:33 | 12345 | 6505654322 |
| 000006 | 2014/4/25 00:59:25 | 34389 | 0756765433 |
| 000007 | 2014/4/25 01:05:12 | 36897 | 6345454771 |
| 000008 | 2014/4/25 01:10:19 | 43933 | 7878657532 |
| 000009 | 2014/4/25 01:16:23 | 12345 | 7675210990 |
| 000010 | 2014/4/25 01:22:54 | 34325 | 1323843534 |
| 000011 | 2014/4/25 01:29:51 | 23413 | 0765724555 |
| 000012 | 2014/4/25 01:37:49 | 12345 | 4325608990 |
| 000013 | 2014/4/25 01:41:55 | 84554 | 0776741454 |

Rows 000001–000006: 1100
Rows 000007–000013: 1200

*SEARCHING FOR MORE...*

FIG.12

ORDER LIST SEARCH

| ORDER NUMBER | ORDER TIME | PRODUCT CODE | BUYER ID |
|---|---|---|---|
| 000001 | 2014/4/25 00:01:30 | 12345 | 7801247072 |
| 000002 | 2014/4/25 00:30:27 | 23456 | 5728014721 |
| 000003 | 2014/4/25 00:35:51 | 12345 | 3565363346 |
| 000004 | 2014/4/25 00:44:01 | 74982 | 7654322712 |
| 000005 | 2014/4/25 00:52:33 | 12345 | 6505654322 |
| 000006 | 2014/4/25 00:59:25 | 34389 | 0756765433 |
| 000007 | 2014/4/25 01:05:12 | 36897 | 6345454771 |
| 000008 | 2014/4/25 01:10:19 | 43933 | 7878657532 |
| 000009 | 2014/4/25 01:16:23 | 12345 | 7675210990 |
| 000010 | 2014/4/25 01:22:54 | 34325 | 1323843534 |
| 000011 | 2014/4/25 01:29:51 | 23413 | 0765724555 |
| 000012 | 2014/4/25 01:37:49 | 12345 | 4325608990 |
| 000013 | 2014/4/25 01:41:55 | 84554 | 0776741454 |
| 000014 | 2014/4/25 02:01:00 | 64564 | 9123756377 |
| 000015 | 2014/4/25 02:05:02 | 96454 | 1089044567 |
| 000016 | 2014/4/25 02:15:09 | 95656 | 0067711210 |
| 000017 | 2014/4/25 02:38:31 | 34235 | 0089899932 |

Rows 000001–000006: 1100
Rows 000007–000013: 1200
Rows 000014–000017: 1300

*SEARCHING FOR MORE...*

FIG.13

| SELLER TERMINAL INDICATION INFORMATION | PROPERTIES INFORMATION ||||| 
|---|---|---|---|---|---|
| | CPU CLOCK SPEED | RAM CAPACITY | TIME SLOT | USER-SPECIFIED | ... |
| COMP_A | 1.0 [GHz] | 1.0 [GB] | 10:00-19:00 | ON | ... |
| COMP_B | 2.0 [GHz] | 4.0 [GB] | 9:30-17:30 | OFF | ... |
| COMP_C | 3.0 [GHz] | 8.0 [GB] | 20:00-24:00 | OFF | ... |
| ... | ... | ... | ... | ... | ... |

FIG.20

INFORMATION PROCESSING SYSTEM, TERMINAL, SERVER, INFORMATION PROCESSING METHOD, RECORDING MEDIUM, AND PROGRAM

CROSS REFERENCE TO RELATED APPLICATIONS

This application is a National Stage of International Application No. PCT/JP2014/064135, filed on May 28, 2014, the contents of all of which are incorporated herein by reference in their entirety.

TECHNICAL FIELD

The present disclosure relates to an information processing system, a terminal, a server, an information processing method, a recording medium, and a program suitable for distributing a load related to sorting and improving the user experience.

BACKGROUND ART

There exists a client/server system in which data is saved in a database on a server, and the server searches or analyzes data and the like according to a request from a terminal. The terminal transmits a request called a query, and the server replies to the terminal with a response to the query.

The query may be, for example, a request to extract records matching a search condition, and sort the records on the basis of a specified sort condition. The server extracts records on the basis of the search condition, sorts the records on the basis of the sort condition, and transmits the result to the terminal.

As a client/server system, Patent Literature 1 discloses a batch processing system with a special technique of assigning category values to key values required to access a database. Consequently, sequential access becomes possible within the same block, enabling fast reads.

CITATION LIST

Patent Literature

Patent Literature 1: Unexamined Japanese Patent Application Kokai Publication No. 2012-008725

SUMMARY OF INVENTION

Technical Problem

On the other hand, in a client/server system, if there are concentrated queries from client to server, or if there is a high-load query for the server, the response of the overall system slows, and there is a risk of escalating user frustration. In particularly, sorting extracted records requires a storage area for sorting, but if access to the system is concentrated, sufficient storage area may be unavailable, leading to slower response or failure. Also, predicting the times of concentrated queries is difficult, and foreseeing how much a load a requested query will impose on the server before executing the query is also difficult.

The present disclosure has been devised in light of circumstances like the above, and an objective thereof is to provide to an information processing system, a terminal, a server, an information processing method, a recording medium, and a program suitable for distributing a load related to sorting and improving the user experience.

Solution to Problem

An information processing system according to a first aspect of the present disclosure is an information processing system comprising a server and a terminal, wherein the terminal transmits a main query to the server, the server receives the main query from the terminal, splits the main query into a plurality of sub queries in an order based on a sort condition, and transmits the sub queries to the terminal, the terminal receives the plurality of sub queries from the server, and transmits the plurality of sub queries to the server in the order, when the server receives one of the sub queries from the terminal, the server searches for records satisfying the relevant sub query, and transmits searched records to the terminal, the terminal receives the searched records, and displays the received records being arranged in the order, and records satisfying the sub queries are sorted according to the sort condition by the server or the terminal, and displayed by the terminal arranged in the order.

The server may also decide a number of the sub queries to obtain by splitting the main query, on the basis of a load on the server.

The server may also decide a number of the sub queries to obtain by splitting the main query, on the basis of a number of records satisfying the main query.

If the number of records satisfying the main query is equal to or greater than a threshold value, the server may also transmit the plurality of sub queries to the terminal, and if the number of records satisfying the main query is less than the threshold value, the server may also search for, and transmit to the terminal, records satisfying the main query.

The server may also search for records satisfying a first sub query in the order, and instead of the first sub query, transmit the-searched records to the terminal, and transmit remaining sub queries other than the first sub query to the terminal, and the terminal may also transmit the remaining sub queries in the order to the server in the order.

The server may also sort records satisfying the sub queries according to the sort condition.

The terminal may also sort and display records satisfying the sub queries according to the sort condition.

The terminal may also decide whether or not to split the main query into the sub queries, on the basis of a load on the terminal, and the server may also split the main query into the sub queries if the terminal decides to split the main query into the sub queries.

The server may also split the main query into the plurality of sub queries by equally splitting a search condition included in the main query.

The records may also include a time of receiving an order for a product, the search condition may also include a condition specifying a range of the time, and the server may also split the search condition included in the main query into the plurality of sub queries by increasing a number of subdivisions of the split in time slots containing a larger number of the orders for a product.

The search condition may also include a condition specifying a range of time, and the server may also split the search condition included in the main query into the plurality of sub queries by increasing a number of subdivisions of the split in time slots containing a larger number of accesses to the server.

A terminal according to another aspect of the present disclosure comprises:

a transmitter that transmits a main query to a server; and a receiver that receives from the server a plurality of sub queries obtained by splitting the main query in an order based on a sort condition, wherein the transmitter transmits the plurality of sub queries to the server in the order, and the receiver receives, from the server, records satisfying a sub query that are searched when the server receives one of the sub queries, the terminal further comprising:

a display that displays the received records being arranged in the order, wherein records satisfying the sub queries are sorted according to the sort condition by the server or the terminal, and displayed by the display arranged in the order.

A server according to another aspect of the present disclosure comprises:

a receiver that receives a main query from a terminal; and a transmitter that splits the main query into a plurality of sub queries in an order based on a sort condition, and transmits the plurality of sub queries to the terminal, wherein the receiver receives the sub queries from the terminal in the order, when the receiver receives one of the sub queries from the terminal, the transmitter searches for records satisfying the relevant sub query, and transmits the searched records to the terminal, and records satisfying the sub queries are sorted according to the sort condition by the server or the terminal.

An information processing method according to another aspect of the present disclosure comprises:

a transmitting step of a terminal transmitting a main query to a server; and a receiving step of the terminal receiving from the server a plurality of sub queries obtained by splitting the main query in an order based on a sort condition, wherein in the transmitting step, the terminal transmits the plurality of sub queries to the server in the order, and in the receiving step, the terminal receives, from the server, records satisfying a sub query that are searched when the server receives one of the sub queries, the information processing method further comprising:

a displaying step of the terminal displaying the received records being arranged in the order, wherein records satisfying the sub queries are sorted according to the sort condition by the server or the terminal, and displayed in the displaying step arranged in the order.

An information processing method according to another aspect of the present disclosure comprises:

a receiving step of a server receiving a main query from a terminal; and a transmitting step of the server splitting the main query into a plurality of sub queries in an order based on a sort condition, and transmitting the plurality of sub queries to the terminal, wherein in the receiving step, the server receives the sub queries from the terminal in the order, in the transmitting step, when the server receives one of the sub queries from the terminal, the server searches for records satisfying the relevant sub query, and transmits the searched records to the terminal, and records satisfying the sub queries are sorted according to the sort condition by the server or the terminal.

A computer-readable recording medium according to another aspect of the present disclosure causes a computer to function as:

a transmitter that transmits a main query to a server; and a receiver that receives from the server a plurality of sub queries obtained by splitting the main query in an order based on a sort condition, wherein the transmitter transmits the plurality of sub queries to the server in the order, and the receiver receives, from the server, records satisfying a sub query that are searched when the server receives one of the sub queries, the computer-readable, non-transitory recording medium additionally causing the computer to function as:

a display that displays the received records being arranged in the order, wherein records satisfying the sub queries are sorted according to the sort condition by the server or the computer, and displayed by the display arranged in the order.

A computer-readable recording medium according to another aspect of the present disclosure causes a computer to function as:

a receiver that receives a main query from a terminal; and a transmitter that splits the main query into a plurality of sub queries in an order based on a sort condition, and transmits the plurality of sub queries to the terminal, wherein the receiver receives the sub queries from the terminal in the order, when the receiver receives one of the sub queries from the terminal, the transmitter searches for records satisfying the relevant sub query, and transmits the searched records to the terminal, and records satisfying the sub queries are sorted according to the sort condition by the computer or the terminal.

A program according to another aspect of the present disclosure causes a computer to function as:

a transmitter that transmits a main query to a server; and a receiver that receives from the server a plurality of sub queries obtained by splitting the main query in an order based on a sort condition, wherein the transmitter transmits the plurality of sub queries to the server in the order, and the receiver receives, from the server, records satisfying a sub query that are searched when the server receives one of the sub queries, the program additionally causing the computer to function as:

a display that displays the received records being arranged in the order, wherein records satisfying the sub queries are sorted according to the sort condition by the server or the computer, and displayed by the display arranged in the order.

A program according to another aspect of the present disclosure causes a computer to function as:

a receiver that receives a main query from a terminal; and a transmitter that splits the main query into a plurality of sub queries in an order based on a sort condition, and transmits the plurality of sub queries to the terminal, wherein the receiver receives the sub queries from the terminal in the order, when the receiver receives one of the sub queries from the terminal, the transmitter searches for records satisfying the relevant sub query, and transmits the searched records to the terminal, and records satisfying the sub queries are sorted according to the sort condition by the computer or the terminal.

The above program may be distributed or sold via a computer communication network, independently of the computer on which the program is executed. In addition, the above recording medium may be a non-transitory recording medium, and may be distributed or sold independently of the computer.

Advantageous Effects of Invention

According to the present disclosure, it is possible to distribute a load related to sorting and improve the user experience.

BRIEF DESCRIPTION OF DRAWINGS

FIG. 3 is a diagram illustrating an example of product information stored in a product database;

FIG. 4 is a diagram illustrating an example of an order list stored in an order list database;

FIG. 9 is a diagram illustrating an example of a screen that displays search results;

FIG. 10 is a diagram illustrating an example of a screen that displays a detailed search result;

FIG. 12 is a diagram illustrating an example of a screen that displays search results according to first and second sub queries;

FIG. 13 is a diagram illustrating an example of a screen that displays search results according to first, second, and third sub queries;

FIG. 20 is a diagram illustrating a configuration of a properties table.

DESCRIPTION OF EMBODIMENTS

Embodiments of the present disclosure will be described. The embodiments hereinafter are for the purpose of explanation, and do not restrict the scope of the present disclosure. Consequently, although a person ordinarily skilled in the art may be able to adopt embodiments in which some or all of these elements have been substituted with their equivalents, such embodiments are also included in the scope of the present disclosure.

(Embodiment 1)

Figure 1:
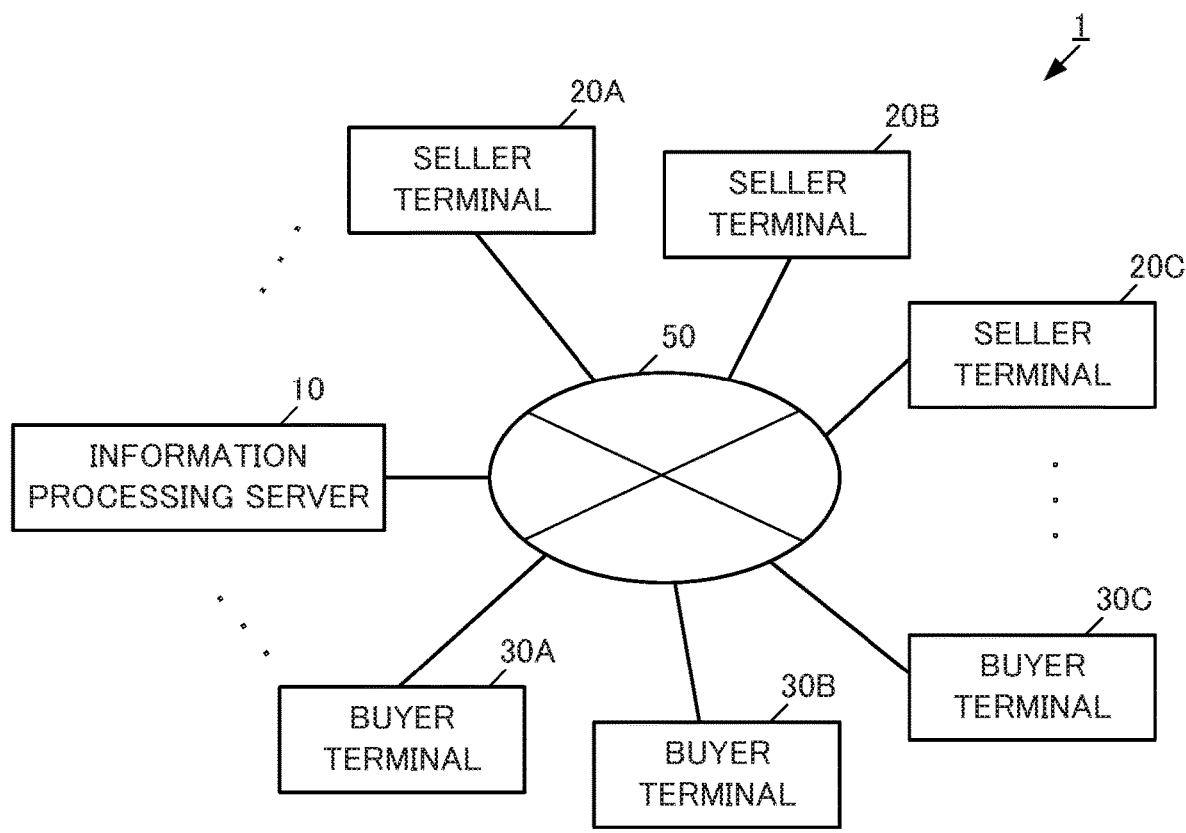
FIG. 1 is a diagram illustrating an overview of a configuration of an information processing system.

First, an overall configuration of an information processing system 1 according to the present embodiment will be described using FIG. 1. The information processing system 1 realizes a virtual shopping mall (electronic shopping mall) on the Internet. The information processing system 1 includes an information processing server 10, a seller terminal 20 which is installed at one or more stores that set up a storefront in an electronic shopping mall, and which is operated by a person selling a product (in FIG. 1, there are three seller terminals 20A, 20B, and 20C), a buyer terminal 30 operated by a person who shops at the electronic shopping mall (in FIG. 1, there are three buyer terminals 30A, 30B, and 30C), and a communication network 50. In the present embodiment, the communication network 50 is the Internet.

The information processing server 10 manages an electronic shopping mall in which multiple stores participate. The information processing server 10 is managed by an administrator of the electronic shopping mall. The number of stores participating in the electronic shopping mall is arbitrary. In the electronic shopping mall, various products and services are sold.

Hereinafter, for the sake of simplicity, products and services will be collectively designated "products", which may include intangible services such as hotel reservations, online tickets, digital content such as music and video, and software licenses, for example.

The information processing server 10 includes a product information database that stores product information related to products sold by stores.

The product information is provided to the buyer terminal 30 via a webpage accessible from the buyer terminal 30. The webpage may be made up of information such as HTML (HyperText Markup Language) data, image data, and audio data. The webpage may also be in a format other than the HTML format, such as XML (Extensible Markup Language) format or XHTML (Extensible HyperText Markup Language) format. Alternatively, the product information may be provided to the buyer terminal 30 by using a dedicated application provided by the electronic shopping mall and installed on the buyer terminal 30 in advance.

Also, the information processing server 10 accepts a purchase order from a person who operates the buyer terminal 30 to view and buy a product (hereinafter designated a "buyer"), and stores an accepted purchase order in an order list database.

The seller terminal 20 is installed in a store that sells a product at the electronic shopping mall. A manager of the store (hereinafter designated a "user") operates the seller terminal 20 to register product information indicating a product sold by that store in the product information database.

Also, from the information processing server 10, the seller terminal 20 acquires and displays a product order list on the basis of an operation by the user. For example, if the user specifies a search condition, the seller terminal 20 transmits a query including the search condition to the information processing server 10. The information processing server 10 transmits search results to the seller terminal 20. The seller terminal 20 displays the received search results.

The buyer terminal 30 is operated by the buyer. The buyer operates the buyer terminal 30 to access the information processing server 10, view product information, and submit an order to purchase a product.

The communication network 50 interconnects the information processing server 10, the seller terminal 20, and the buyer terminal 30. The communication network 50 is typically the Internet, but may also include a phone line, a dedicated line, or a LAN (Local Area Network), for example.

Figure 2:
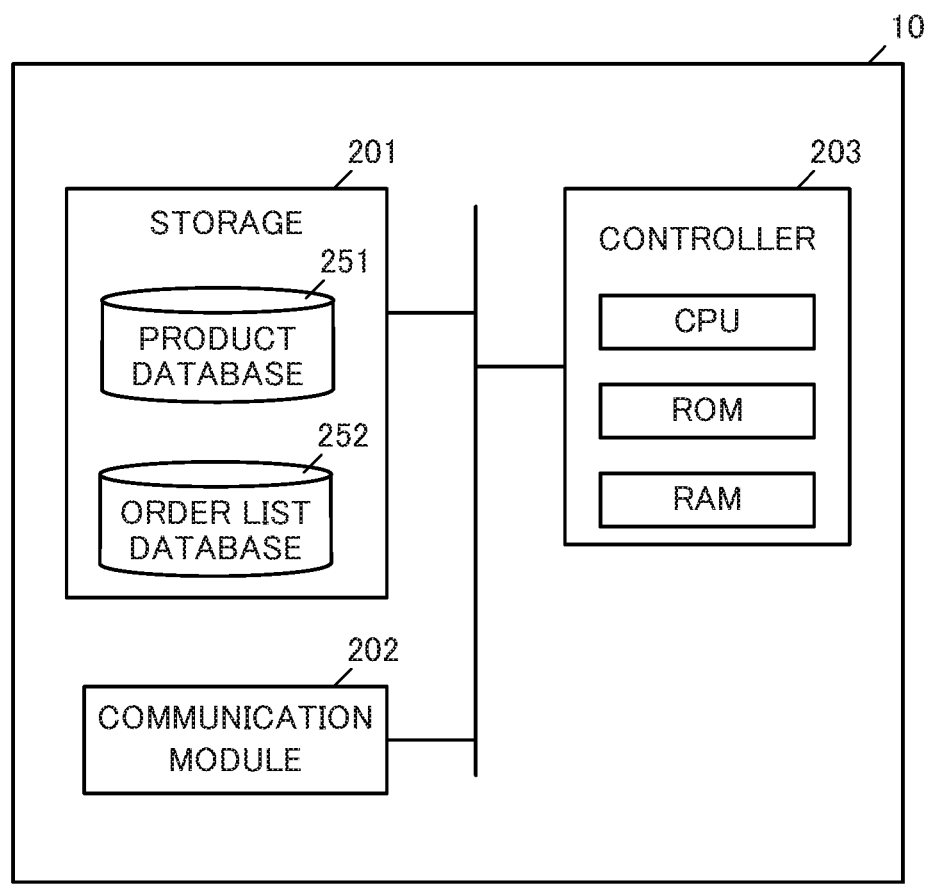
FIG. 2 is a diagram illustrating a configuration of an information processing server.

Next, a hardware configuration of the information processing server 10 will be described using FIG. 2. The information processing server 10 is equipped with storage 201, a communication module 202, and a controller 203.

The storage 201 is made up of a storage device such as a hard disk. The storage 201 stores a product database 251 that stores product information for all products offered for sale in the electronic shopping mall, and an order list database 252 that stores an order list, which is a list of products with accepted purchase orders from buyers.

FIG. 3 illustrates an exemplary structure of product information stored in the product database 251. The product database 251 stores various data indicating the attributes of a product, such as a product name, a store code identifying a store, an inventory count, and a sale price, in association with a product code that identifies the product. The product information is updated as needed by the seller terminal 20 or the information processing server 10.

FIG. 4 illustrates an exemplary structure of an order list stored in the order list database 252. The order list database 252 stores information such as a buyer ID identifying a buyer, a product code, a store code, and a purchase quantity, in association with the time of receiving an order. The order list is updated as needed by the information processing server 10. Other information, such as an address, a type of payment method, and a payment status may also be stored in the order list.

The communication module 202 is equipped with a NIC (Network Interface Card), connects the information processing server 10 to the communication network 50, and communicates with the seller terminal 20 and the buyer terminal 30.

The controller 203 is equipped with components such as a CPU (Central Processing Unit), ROM (Read-Only Memory), and RAM (Random Access Memory), and controls the information processing server 10 overall.

For the information processing server 10, a device such as a typical computer server, mainframe, or cloud server may be used.

Figure 5:
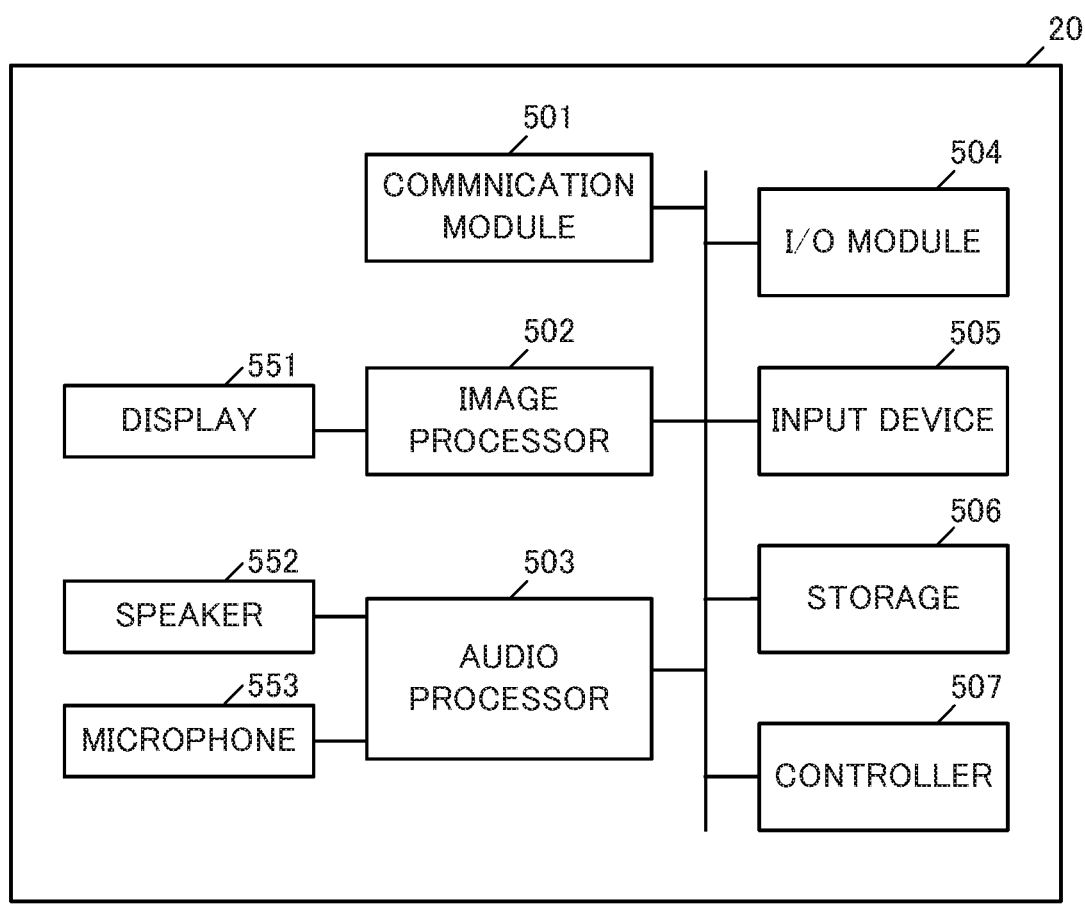
FIG. 5 is a diagram illustrating a configuration of a seller terminal.

Next, a hardware configuration of the seller terminal 20 will be described using FIG. 5. The seller terminal 20 is equipped with a communication module 501, an image processor 502, an audio processor 503, an I/O (Input/Output) module 504, an input device 505, storage 506, and a controller 507.

The communication module 501 is equipped with a NIC, connects the seller terminal 20 to the communication network 50, and communicates with the information processing server 10.

The image processor 502 generates an image to display on a display 551. For example, the image processor 502 generates, and displays on the display 551, a screen that accepts user input specifying a search condition of the order list. Also, the image processor 502 displays, on the display 551, an order list as search results acquired from the information processing server 10.

In the present embodiment, the image processor 502, under control by the controller 507, displays an order list in a software application enabling a user to view information, also called a browser.

The audio processor 503 acquires and plays back audio data from sources such as the storage 506 or the information processing server 10 so that audio is output from a speaker 552.

The I/O module 504 is equipped with an interface that connects a removable memory card to the seller terminal 20.

The input device 505 is equipped with an interface that accepts input from the user. In the present embodiment, the input device 505 is provided with a keyboard and a mouse.

The storage 506 is equipped with storage devices such as ROM and RAM, and stores information such as an operating system that controls the seller terminal 20, various programs, image data, audio data, and text data.

The controller 507 is equipped with a CPU, and controls the seller terminal 20 overall.

For the seller terminal 20, a device such as a typical personal computer having communication functions, a mobile phone, a smartphone, a mobile terminal, or a tablet computer may be used. In the present embodiment, a personal computer is adopted as the seller terminal 20.

Note that since the hardware configuration of the buyer terminal 30 is similar to the seller terminal 20, detailed description will be omitted herein.

Next, a search process executed by the information processing system 1 of the present embodiment will be described.

The operator of the buyer terminal 30 is able to use a browser or the like to view product information, and submit an order to purchase a desired product to the electronic shopping mall. The buyer terminal 30 transmits data indicating the purchase order for the product to the information processing server 10. The information processing server 10 receives the data indicating a purchase order for the product from the buyer terminal 30, and records the received purchase order for the product in the order list database 252. Also, the information processing server 10 notifies the purchase order for the product to the store selling that product by email, for example.

The manager of the store is able to use the seller terminal 20 to view various information as needed, such as the order status of a product, contact information for a buyer who has ordered a product, a product delivery destination, and a payment status.

For example, when the user (the manager of the store) wants to check a list of all products for which the store received orders yesterday during the time from 00:00 to 23:59, the user specifies an order time of "yesterday from 00:00 to 23:59" as a search condition. The seller terminal 20 transmits a query including the specified search condition to the information processing server 10. The information processing server 10 searches the order list database 252 on the basis of the received query. The information processing server 10 transmits search results to the seller terminal 20.

A query according to the present embodiment encompasses the two types of a main query and a sub query. In the following description, a query expressing a search condition specified by the user (in other words, the query that the information processing server 10 first receives from the seller terminal 20) is designated a "main query", while a query generated as a result of the information processing server 10 splitting a main query 600 according to a process discussed later is designated a "sub query".

Figure 6A:
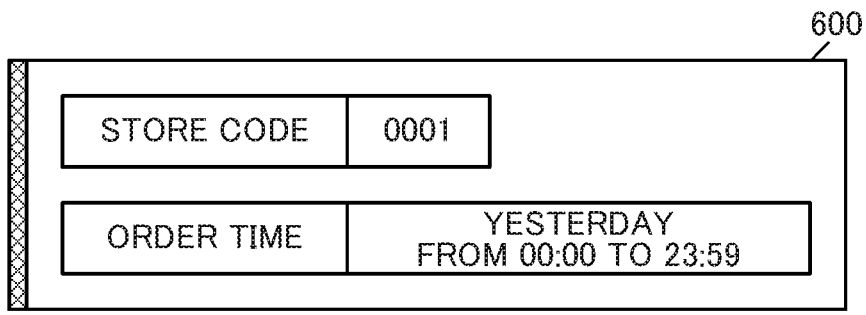
FIG. 6A is a diagram illustrating an example of a main query.
Figure 6B:
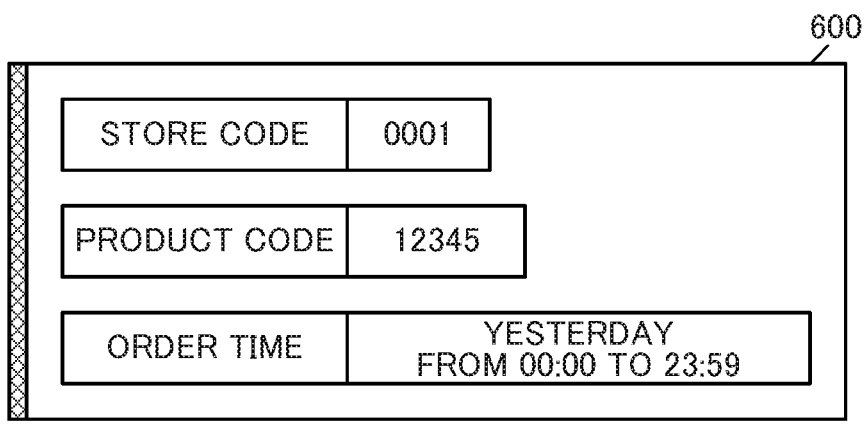
FIG. 6B is a diagram illustrating an example of a main query.
Figure 6C:
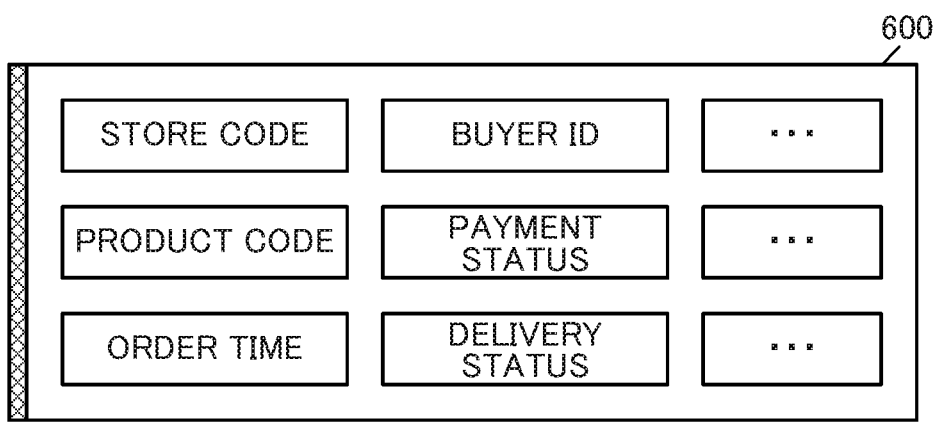
FIG. 6C is a diagram illustrating an example of a main query.

FIGS. 6A, 6B, and 6C diagrammatically illustrate a main query 600. The main query 600 states a query to the information processing server 10. Typically, the main query 600 is stated in SQL (Structured Query Language). However, instead of using SQL, query text in a predetermined format that includes a search condition and response text in a predetermined format that includes a search result may also be used.

For example, in the case of acquiring order data from the order list database 252 for which the store code is "0001" and the order time is "yesterday from 00:00 to 23:59", the controller 507 of the seller terminal 20 generates a main query 600 specifying the store code and the order time as illustrated in FIG. 6A, and transmits the generated main query 600 to the information processing server 10.

Alternatively, in the case of searching for order data from the order list database 252 for which the store code is "0001", the product code is "12345", and the order time is "yesterday from 00:00 to 23:59", the controller 507 of the seller terminal 20 generates a main query 600 specifying the store code, the product code, and the order time as illustrated in FIG. 6B, and transmits the generated main query 600 to the information processing server 10.

The search condition included in the main query 600 is not limited just the store code, the product, and the order time, and may specify conditions using all items included in the order list database 252.

For example, if items such as a buyer ID identifying a buyer who ordered a product, a payment status expressing information such as whether or not a payment process is complete or when a buyer is scheduled to deposit money, and a delivery status expressing information such as whether or not a product delivery process is complete or when a product is scheduled to be delivered are predefined in the order list database 252, the seller terminal 20 may generate a main query 600 specifying conditions such as the buyer ID, payment status, and delivery status, as illustrated in FIG. 6C.

The controller 203 of the information processing server 10 receives the main query 600 from the seller terminal 20, searches the order list database 252 on the basis of the main query 600, and transmits records obtained by search to the seller terminal 20.

Note that the main query 600 may also include a sort condition for sorting extracted records, as discussed later.

Meanwhile, since the seller terminal 20 is installed at each store that sets up a storefront in the electronic shopping mall, as the number of stores increases, the number of main queries 600 transmitted to the information processing server 10 also increases. In addition, some stores may need to ascertain the order status frequently, and the frequency at which main queries 600 are transmitted and received increases. As a result, the load on the information processing server 10 related to the search processing becomes intensive, and there is not only a risk of search processing taking a longer time, but also the response of the information processing server 10 as whole becoming slower.

Accordingly, in the present embodiment, when the information processing server 10 receives a main query 600 from the seller terminal 20, the information processing server 10 is configured to not immediately and unconditionally execute the main query 600, but rather to split up and execute the main query 600 on the basis of factors such as the size of the current processing load on the information processing server 10, and the number of records that satisfy a search condition included in the main query 600.

Figure 7:
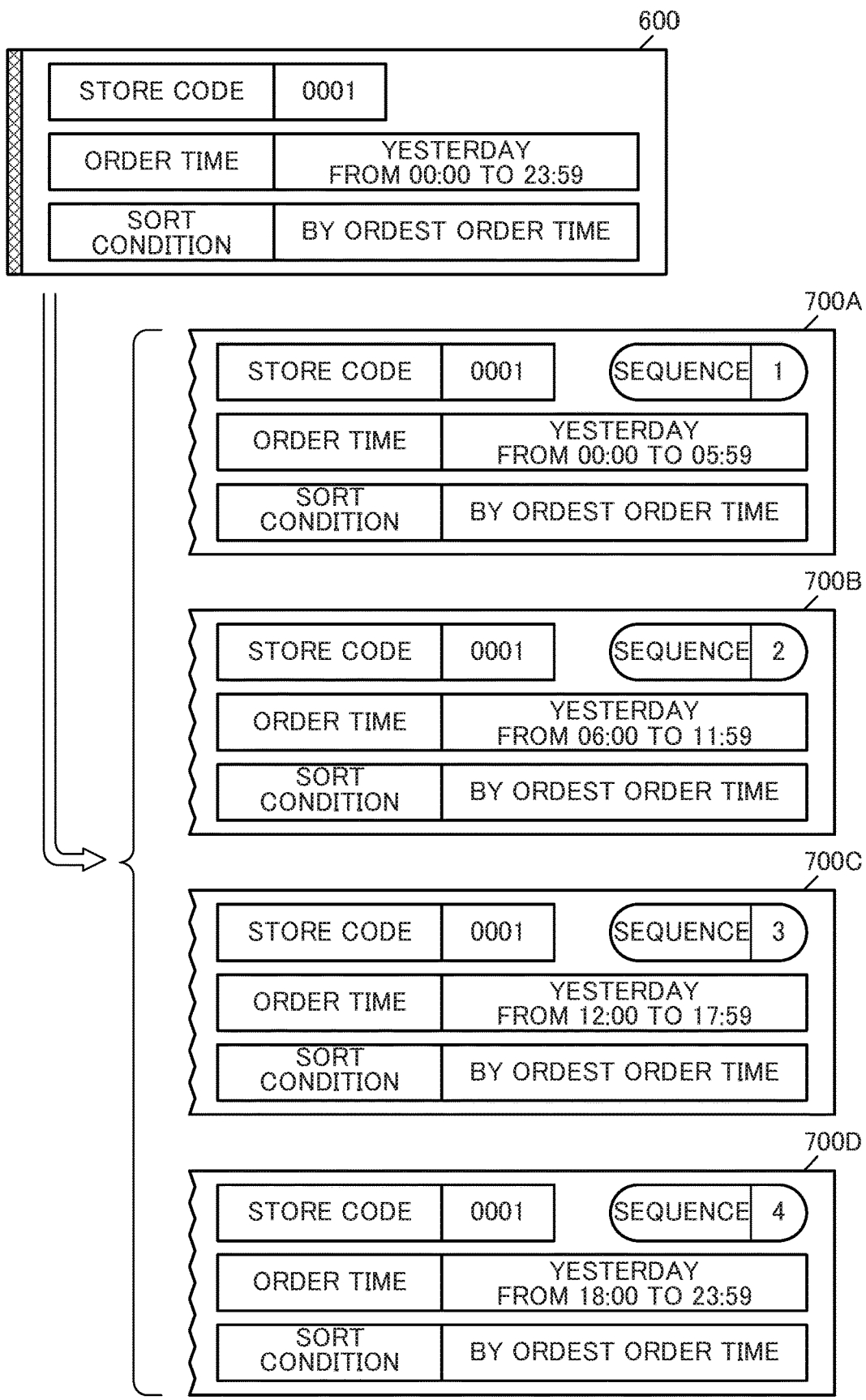
FIG. 7 is a diagram illustrating an example of a main query and a sub query.

A query expressing the search condition specified by the user is the main query 600, while a query obtained by the information processing server 10 splitting the main query 600 as illustrated in FIG. 7 is a sub query 700.

FIG. 7 illustrates an example of a main query 600 and sub queries 700 (in FIG. 7, the four sub queries 700A, 700B, 700C, and 700D). The main query 600 expresses a query to the information processing server 10 with a search condition specifying a store code of "0001" and an order time of "yesterday from 00:00 to 23:59", and a sort condition specifying "by oldest order time".

The controller 203 of the information processing server 10, upon determining that a predetermined split condition is satisfied, splits the main query 600 into multiple sub queries 700 on the basis of the sort condition specified by the user.

More specifically, from the search condition included in the main query 600, the controller 203 splits a range specified by a width, such as an order period, for example, into multiple ranges.

As illustrated in FIG. 7, provided that the search condition indicated by the main query 600 includes an order period of "yesterday from 00:00 to 23:59", and in addition, "by oldest order time" is specified as the sort condition, the controller 203 equally splits the specified order period into the four segments of (1) yesterday from 00:00 to 05:59, (2) yesterday from 06:00 to 11:59, (3) yesterday from 12:00 to 17:59, and (4) yesterday from 18:00 to 23:59.

Subsequently, the controller 203 generates, and transmits to the seller terminal 20, four sub queries 700A, 700B, 700C, and 700D specifying the respectively split segments as the range of order time.

The sub query 700A is a query specifying an order time of "yesterday from 00:00 to 05:59". The sub query 700B is a query specifying an order time of "yesterday from 06:00 to 11:59". The sub query 700C is a query specifying an order time of "yesterday from 12:00 to 17:59". The sub query 700D is a query specifying an order time of "yesterday from 18:00 to 23:59".

If the sub queries 700A, 700B, 700C, and 700D are all executed once each, search processing equal to executing the main query 600 once is obtained. The controller 203 either executes the main query 600 once, or executes the sub queries 700A, 700B, 700C, and 700D one at a time in succession, depending on the situation.

The order in which to execute the queries is configured by the information processing server 10 in the sub queries 700A, 700B, 700C, and 700D. Among the generated multiple sub queries 700, the controller 203 of the information processing server 10 configures the query with oldest period indicating an order time as first. The controller 203 then configures the order sequentially in order of oldest period indicating an order time. For the sub queries 700 illustrated in FIG. 7, the configured order is the sub query 700A, the sub query 700B, the sub query 700C, and the sub query 700D.

The seller terminal 20 transmits the sub queries 700A, 700B, 700C, and 700D to the information processing server 10 in the configured order. However, the transmission timing of the second sub query 700B is after a response to the first sub query 700A (search result) is received. Similarly, the transmission timing of the third sub query 700C is after a response to the second sub query 700B is received, and the transmission timing of the fourth sub query 700D is after a response to the third sub query 700C is received.

Note that the order in which to execute the sub queries 700 is preferably the same as the order in which the seller terminal 20 displays search results on the display 551. For example, in a typical sales method in an electronic shopping mall, orders are processed in order of oldest order time, or in other words, FIFO (First-In, First-Out). Consequently, the sub query 700A with the oldest order time is executed first and transmitted to the seller terminal 20, enabling the user to quickly view purchase orders with older order times.

The number of sub queries 700 obtained by splitting, or in other words, the split number of search condition is taken to be four in FIG. 7, but may also be three or less, or five or more, and is arbitrary.

In addition, the controller 203 may also split a search condition specified in the main query 600 evenly, or with a bias.

In other words, in FIG. 7, although the controller 203 splits the order period into four equal segments of six hours each, the order period may also be split into four segments of unequal length, such as (1) yesterday from 00:00 to 02:59, (2) yesterday from 03:00 to 11:59, (3) yesterday from 12:00 to 20:59, and (4) yesterday from 21:00 to 23:59, for example.

In the case of splitting a specified segment into multiple unequal segments, the controller 203 may also split the search condition into segments of length based on past order results.

In other words, the controller 203 may take statistics of past order times recorded in the order list database 252, and increase the number of subdivisions for a time slot with comparatively more orders, and decrease the number of subdivisions for a time slot with comparatively fewer orders. The controller 203 is able to bias the lengths of the segments on the basis of past order results.

For example, if the number of orders during a nighttime time slot is an average of 1000 orders per day, while the number of orders during a daytime time slot is an average of only 10 orders per day, the number of subdivisions may be increased for the nighttime time slot, and decreased for the daytime time slot. This is because a large number of subdivisions in a time slot with a small number of orders contributes very little to distributing the processing load, and a small number of subdivisions in a time slot with a large number of orders likewise contributes very little to distributing the processing load.

The controller 203 may also split the search condition into segments of length based on past viewing results for product data.

For example, the controller 203 may store, in the storage 201, a history of the number of times a webpage that describes and accepts order for a product is viewed (page views), and increase the number of subdivisions in a time slot with a comparatively more page views, and decrease the number of subdivisions in a time slot with comparatively fewer page views. This is because the number of purchase orders is anticipated to increase as the number of page views increases.

In addition, the controller 203 may also stores, in the storage 201, a history of accesses to the information processing server 10, and increase the number of subdivisions in a time slot with a comparatively more accesses, and decrease the number of subdivisions in a time slot with comparatively fewer accesses. Herein, access encompasses not only product data view requests and purchase orders from the buyer terminal 30, but also the transmitting and receiving of queries to and from the buyer terminal 30, and also the seller terminal 20.

One split condition discussed above is "the size of the load from all processes currently being conducted by the information processing server 10 is equal to or greater than a threshold value". The size of a processing load currently being conducted by the information processing server 10 is typically expressed as a utilization rate of hardware resources such as the CPU. If the CPU utilization rate at the time of receiving a main query 600 is equal to or greater than a threshold value (for example, equal to or greater than 50%), the controller 203 splits the main query 600 into multiple sub queries 700. If the CPU utilization rate is less than the threshold value (for example, less than 50%), the controller 203 executes the main query 600 without splitting.

The controller 203 may also determine the size of the processing load currently being executed by the information processing server 10 according to factors such as the seek time of a hard disk that stores the order list database 252 and the seek count per unit time in the hard disk. If the seek time is longer than a reference value, the controller 203 splits the main query 600 into multiple sub queries 700, whereas if the seek time is shorter than the reference value, the controller 203 executes the main query 600 without splitting. Alternatively, if the seek count is greater than a reference value, the controller 203 splits the main query 600 into multiple sub queries 700, whereas if the seek count is less than the reference value, the controller 203 executes the main query 600 without splitting.

Additionally, the split condition may also be "the number of records satisfying a search condition indicated by a main query 600 is equal to or greater than a threshold value". The controller 203 receives a main query 600, and acquires the number of records satisfying the search condition included in the main query 600. A process of simply counting the number of records is less intensive on hardware resources than a process of extracting and sorting the records, to the extent that a sort pool is not used. Accordingly, if the number of records is equal to or greater than a threshold value (for example, equal to or greater than 100), the controller 203 splits the main query 600 into multiple sub queries 700. If the number of records is less than the threshold value (for example, less than 100), the controller 203 executes the main query 600 without splitting.

Subsequently, the controller 203 transmits the generated multiple sub queries 700 to the seller terminal 20. If the number of records is less than the threshold value, the controller 203 executes the main query 600 without splitting, and transmits the records constituting the search results for the main query 600 to the seller terminal 20.

If, as a result of equally splitting a search condition to generate multiple sub queries 700, the number of records satisfying a search condition indicated by a sub query 700 becomes equal to or greater than a threshold value, the controller 203 may also further split that sub query 700.

The controller 507 of the seller terminal 20, upon receiving sub queries 700 from the information processing server 10, transmits the sub queries 700 in the configured order.

The controller 507 of the seller terminal 20, upon receiving search results for the main query 600 or search results for the sub queries 700, sorts the records indicating by the received search results on the basis of the sort condition, and displays the sorted records on the display 551.

Note that if the number of records is equal to or greater than a threshold value, the controller 203 of the information processing server 10 may execute the sub query 700A ordered first among the generated multiple sub queries 700, and transmit the search results for the sub query 700A, together with the remaining sub queries 700B, 700C, and 700D, to the seller terminal 20. Since the search results for the sub query 700A are transmitted from the information processing server 10 to the seller terminal 20, it is not necessary for the information processing server 10 to transmit the sub query 700A to the seller terminal 20. It is sufficient for the information processing server 10 to transmit the second and subsequent sub queries 700B, 700C, and 700D in the configured order. This modification will be described in detail in another embodiment.

Additionally, the split condition may also be "the time taken to execute a query within a preceding predetermined time is equal to or greater than a threshold value". The controller 203 stores a history of SQL query execution times in the storage 201, and calculates an average value of the time taken between starting execution of an SQL query and obtaining results within a preceding predetermined time (for example, within the last 10 minutes). Subsequently, if the calculated average value is equal to or greater than a threshold value (for example, equal to or greater than 3 seconds), the controller 203 splits the main query 600 into multiple sub queries 700.

Instead of an average value of the execution time, the controller 203 may also calculate values such as a maximum value, a mode value, a median value, deviation value, or a variance value.

Additionally, the split condition may also be "the execution time in an SQL query execution plan is equal to or greater than a threshold value". The controller 203 acquires an SQL query execution plan at periodic timings. Subsequently, if the execution time indicated by the execution plan is equal to or greater than a threshold value (for example, equal to or greater than 3 seconds), the controller 203 splits the main query 600 into multiple sub queries 700.

The SQL query whose execution plan is acquired may be a predetermined SQL query used for time measurement, or an SQL query corresponding to an arbitrary main query 600.

For example, if the SQL statement "EXPLAIN PLAN" is used, an execution plan may be acquired without executing a query, and thus acquiring an execution plan does not impose an excessive load on the information processing system 1 as a whole.

Next, an example layout of a screen displayed on the seller terminal 20 will be described.

Figure 8:
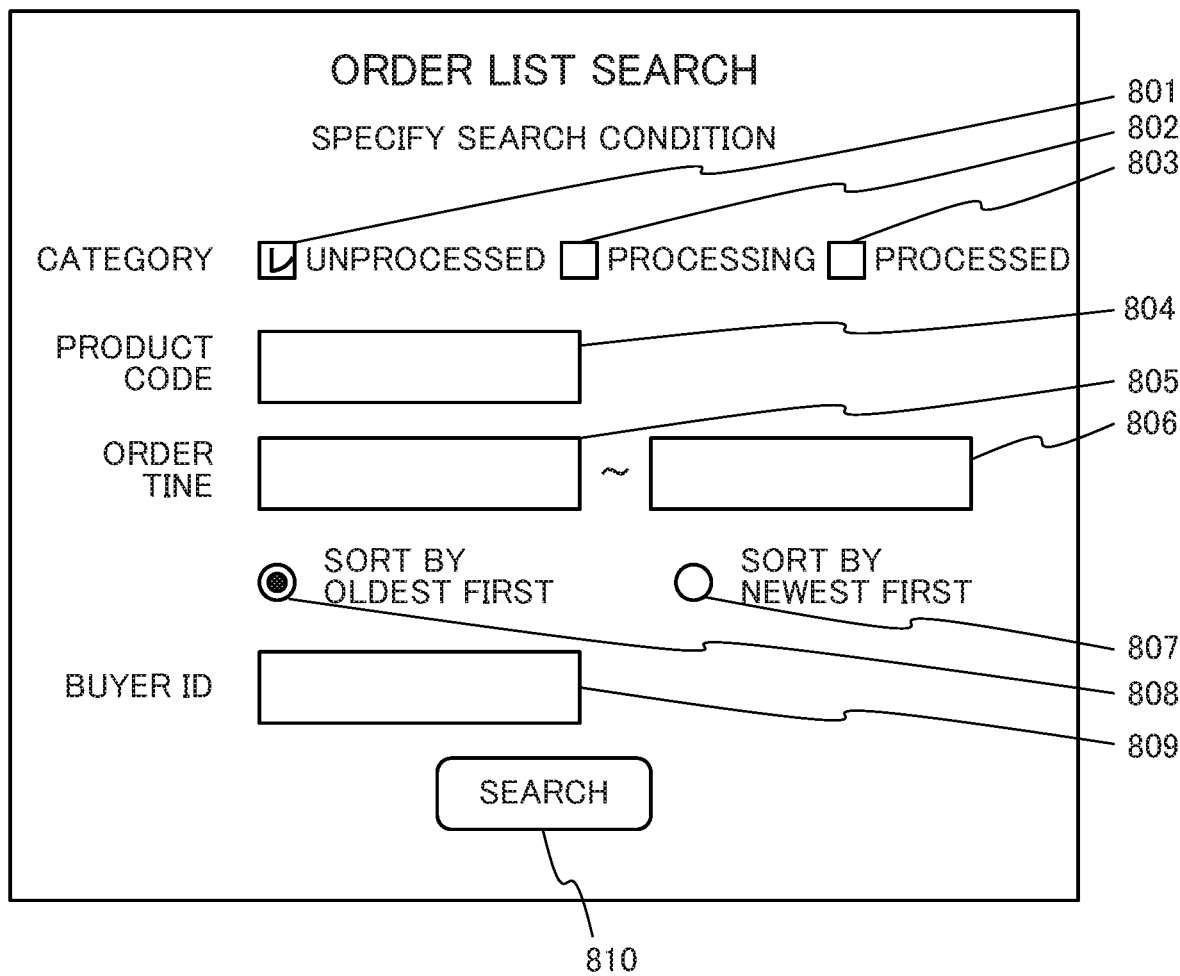
FIG. 8 is a diagram illustrating an example of a screen that specifies a search condition and a sort condition.

FIG. 8 illustrates an example of a screen, displayed by the seller terminal 20, that accepts the specification of a search condition and a sort condition from the user. The screen includes, for example, checkboxes 801, 802, and 803 that select a category of an order process status (unprocessed, processing, processed), a field 804 that specifies the product code, fields 805 and 806 that specify a segment indicating the order time, radio buttons 807 and 808 that select the sort condition, a field 809 that specifies the buyer ID, and an instruction button 810 that starts a search according to the specified condition.

The user is able to combine an order process status category, product code, order time, and buyer ID to specify a desired search condition. For example, in the case of including the order process status category and order time in the search condition, it is sufficient for the user input values into the checkboxes 801, 802, and 803 as well as the fields 805 and 806, while leaving the fields 804 and 809 blank.

Also, the user is able to specify a sort condition by turning on one of the radio buttons 807 and 808.

In the present embodiment, there are only the two types of sort condition, by oldest order time and by newest order time, but the sort conditions that may be configured are arbitrary. Also, two or more sort conditions with a defined priority ranking may also be specified. For example, besides order time, the sort condition may also be by character code expressing the product code, or by character code expressing the buyer ID.

The controller 507 is able to construct a screen that accepts the input of a search condition and a sort condition by using objects such as text boxes, radio buttons, checkboxes, list boxes, drop-down lists, and combo boxes.

Each store is assigned a unique store code in advance. The assigned store code is stored in advance in the storage 506 of the seller terminal 20. When generating a main query 600, the controller 507 of the seller terminal 20 automatically includes, in the search condition, a condition stipulating that records match the store code assigned to that store. The user does not have to input the store code for every search.

When the user operates the instruction button 810 after specifying a search condition and a sort condition, the controller 507 generates a main query 600 that includes the specified search condition and sort condition. The controller 203 transmits the generated main query 600 to the information processing server 10.

The controller 203 of the information processing server 10 receives the main query 600, and determines whether or not a split condition is satisfied. The split condition will be discussed in detail later.

If the split condition is not satisfied, the controller 203 executes the main query 600, and transmits one or multiple records indicating the obtained search results to the seller terminal 20. The seller terminal 20 receives the records of the search results from the information processing server 10.

Note that if executing the main query 600 does not return any relevant records, the controller 203 notifies the seller terminal 20 that there are no relevant records.

FIG. 9 illustrates an example display of search results in the case of a search condition indicating that "the category is unprocessed, and the order time is from 2014/04/25 00:00:00 to 2014/04/25 23:59:59", and a sort condition indicating "by oldest order time". The controller 507 of the seller terminal 20 displays a list of records, or in other words search results, received from the information processing server 10.

If not all records can be displayed at once, the controller 507 places a scrollbar 910, and displays the list of records in a scrollable manner.

If the user selects one of the records, the controller 507 of the seller terminal 20 displays details of the selected records, as illustrated in FIG. 10.

In the present embodiment, the controller 507 of the seller terminal 20 first displays a list of records as illustrated in FIG. 9 after receiving the records of search results from the information processing server 10, and if one of the records is selected, the controller 507 displays details of the selected record as illustrated in FIG. 10.

The sorting of records based on the sort condition may be conducted by the information processing server 10, or by the seller terminal 20.

If the seller terminal 20 is configured to conduct sorting, the controller 203 of the information processing server 10 searches on the basis of the search condition included in the main query 600, and transmits unsorted acquired records to the seller terminal 20. The controller 507 of the seller terminal 20 receives the unsorted records, sorts the records on the basis of the sort condition, and displays the sorted records on the display 551.

If the information processing server 10 is configured to conduct sorting, the controller 203 of the information processing server 10 searches on the basis of the search condition included in the main query 600, sorts acquired records on the basis of the sort condition, and transmits the sorted records to the seller terminal 20. The controller 507 of the seller terminal 20 receives the sorted records, and displays the received records directly in the sorted order on the display 551.

In the case of sorting on either of the information processing server 10 and the seller terminal 20, since the number of records to be sorted is small, the storage area for sorting (the sort pool) may be small.

Meanwhile, if the split condition is satisfied, the main query 600 is not executed immediately, and instead the main query 600 is split into multiple sub queries 700. In other words, if the split condition is satisfied, the controller 203 of the information processing server 10 splits the main query 600 into multiple sub queries 700 on the basis of the sort condition, and transmits the sub queries 700 to the seller terminal 20. The seller terminal 20 receives data indicating the sub queries 700 from the information processing server 10.

For example, if the search condition included in the main query 600 indicates that "the category is unprocessed, and the order time is from 2014/04/25 00:00:00 to 2014/04/25 23:59:59", the sort condition included in the main query 600 is "by oldest order time", and the split condition is satisfied, the controller 203 of the information processing server 10 splits the main query 600 into multiple sub queries 700 on the basis of the search condition and the sort condition.

In the case of splitting the order period equally into 24 subdivisions, 24 sub queries 700 are generated.

First sub query 700: The search condition is "category is unprocessed, and order time is from 2014/04/25 00:00:00 to 2014/04/25 00:59:59". The sort condition is "by oldest order time". The configured order is first.

Second sub query 700: The search condition is "category is unprocessed, and order time is from 2014/04/25 01:00:00 to 2014/04/25 01:59:59". The sort condition is "by oldest order time". The configured order is second.

Third sub query 700: The search condition is "category is unprocessed, and order time is from 2014/04/25 02:00:00 to 2014/04/25 02:59:59". The sort condition is "by oldest order time". The configured order is third.

Similarly, the 4th to 24th sub queries 700 are generated.

Note that, more accurately, a search condition specifying the store code included in the main query 600 is included in the sub queries 700.

The controller 507 of the seller terminal 20 receives the 24 sub queries 700, and transmits the first sub query 700 that is ordered first to the information processing server 10.

The controller 203 of the information processing server 10 receives the first sub query 700, and searches the order list database 252 according to the search condition included in the first sub query 700. Additionally, the controller 203 sorts records obtained by search in accordance with the sort condition.

The controller 203 of the information processing server 10 transmits the records obtained by search to the seller terminal 20. The controller 507 of the seller terminal 20 receives the records obtained by search from the information processing server 10.

Figure 11:
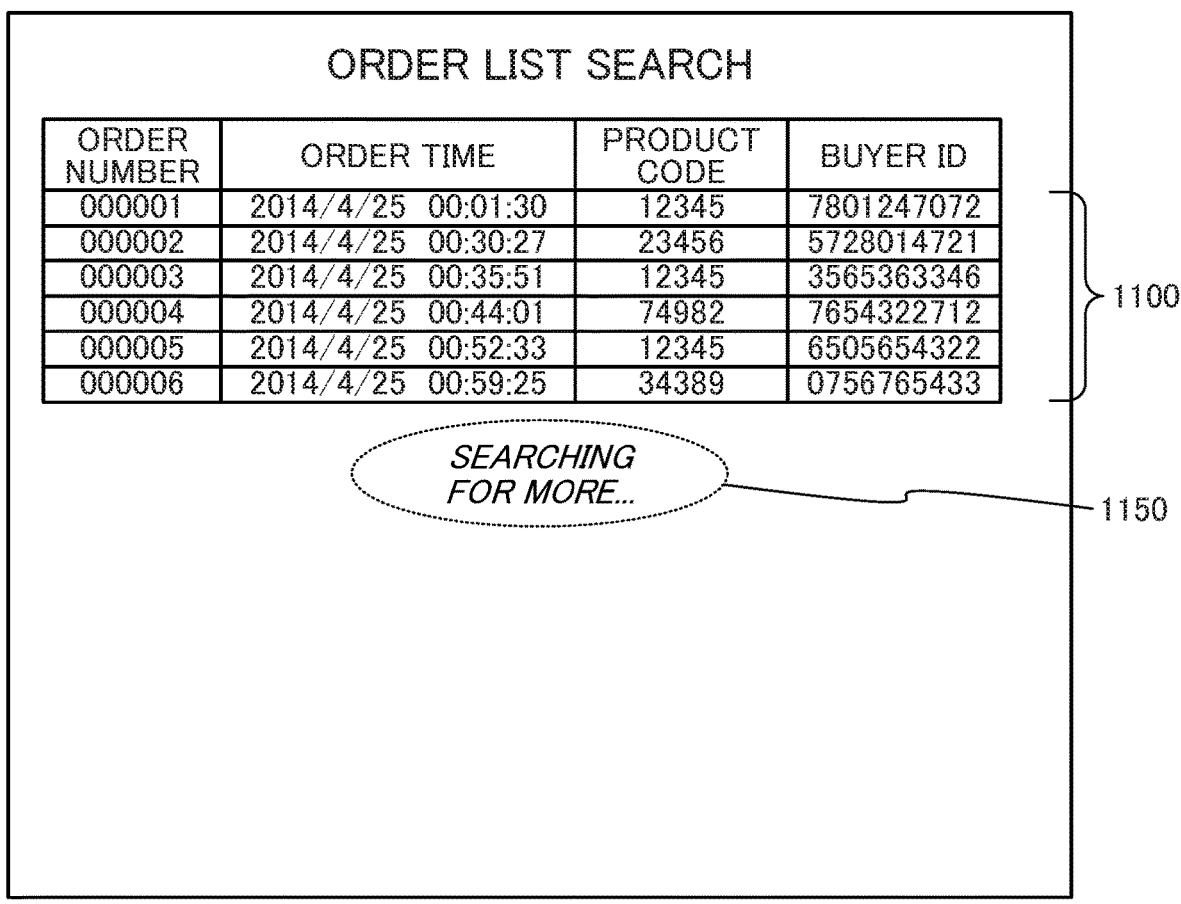
FIG. 11 is a diagram illustrating an example of a screen that displays search results according to a first sub query.

The controller 507 of the seller terminal 20 displays the records 1100 searched by the search condition included in the first sub query 700, as illustrated in FIG. 11.

Note that if the seller terminal 20 is configured to conduct sorting, the controller 203 of the information processing server 10 searches the order list database 252 according to the search condition included in the first sub query 700, and transmits the records obtained by search to the seller terminal 20. The controller 507 of the seller terminal 20 receives the records obtained by search from the information processing server 10, sorts the received records in accordance with the sort condition, and displays the records 1100.

The controller 507 of the seller terminal 20 preferably displays on the display 551 a message 1150 indicating that not all sub queries 700 have been executed, a sub query 700 that has not been executed exists, and the search is still in progress.

After displaying the search results from the first sub query 700, the controller 507 of the seller terminal 20 transmits the second sub query 700 that is ordered second to the information processing server 10. Note that the controller 507 may also transmit the second sub query 700 that is ordered second to the information processing server 10 after receiving the search results for the first sub query 700.

The controller 203 of the information processing server 10 receives the second sub query 700, and searches the order list database 252 according to the search condition included in the second sub query 700. If the information processing server 10 is configured to conduct sorting, the controller 203 of the information processing server 10 sorts records obtained by search in accordance with the sort condition.

The controller 203 of the information processing server 10 transmits the records obtained by search, or the searched and sorted records, to the seller terminal 20. The controller 507 of the seller terminal 20 receives the records obtained by search, or the searched and sorted records, from the information processing server 10.

The controller 507 of the seller terminal 20 adds the records 1200 searched by the search condition included in the second sub query 700 to the end of the records 1100 searched by the search condition included in the first sub query 700. If the seller terminal 20 is configured to conduct sorting, the controller 507 of the seller terminal 20 first sorts the received records in accordance with the sort condition, and then adds the records 1200 to the end of the records 1100.

Note that when displaying the records 1200 constituting the search results from the second sub query 700, the controller 507 does not modify the display position of the already-displayed records 1100 constituting the search results from the first sub query 700.

Since the records 1100 are sorted on the basis of the sort condition, the records 1200 are likewise sorted on the basis of the same sort condition, and the execution order of the sub queries 700, or in other words, the order in which the records 1100 and the records 1200 are displayed is decided on the basis of the sort condition, the entirety of the records 1100 and 1200 is sorted on the basis of the sort condition.

In the case of two sub queries 700, the search process ends at this point.

In the case of three or more sub queries 700, the execution sequence and display sequence for the third and subsequent sub queries 700 is similar to the execution sequence and the display sequence for the first and second sub queries 700.

After displaying the search results from the second sub query 700, the controller 507 of the seller terminal 20 transmits the third sub query 700 that is ordered third to the information processing server 20. Note that the controller 507 may also transmit the third sub query 700 that is ordered third to the information processing server 30 after receiving the search results for the second sub query 700.

The controller 203 of the information processing server 10 receives the third sub query 700, and searches the order list database 252 according to the search condition included in the third sub query 700. If the information processing server 10 is configured to conduct sorting, the controller 203 of the information processing server 10 sorts records obtained by search in accordance with the sort condition.

The controller 203 of the information processing server 10 transmits the records obtained by search, or the searched and sorted records, to the seller terminal 20. The controller 507 of the seller terminal 20 receives the records obtained by search, or the searched and sorted records, from the information processing server 10.

FIG. 13 illustrates an example display of records 1300 searched by the third sub query 700. The controller 507 of the seller terminal 20 adds the records 1300 searched by the search condition included in the third sub query 700 to the end of the records 1200 searched by the search condition included in the second sub query 700.

The information processing system 1 repeats a similar process until all sub queries 700 are executed and the search results are displayed.

Figure 14:
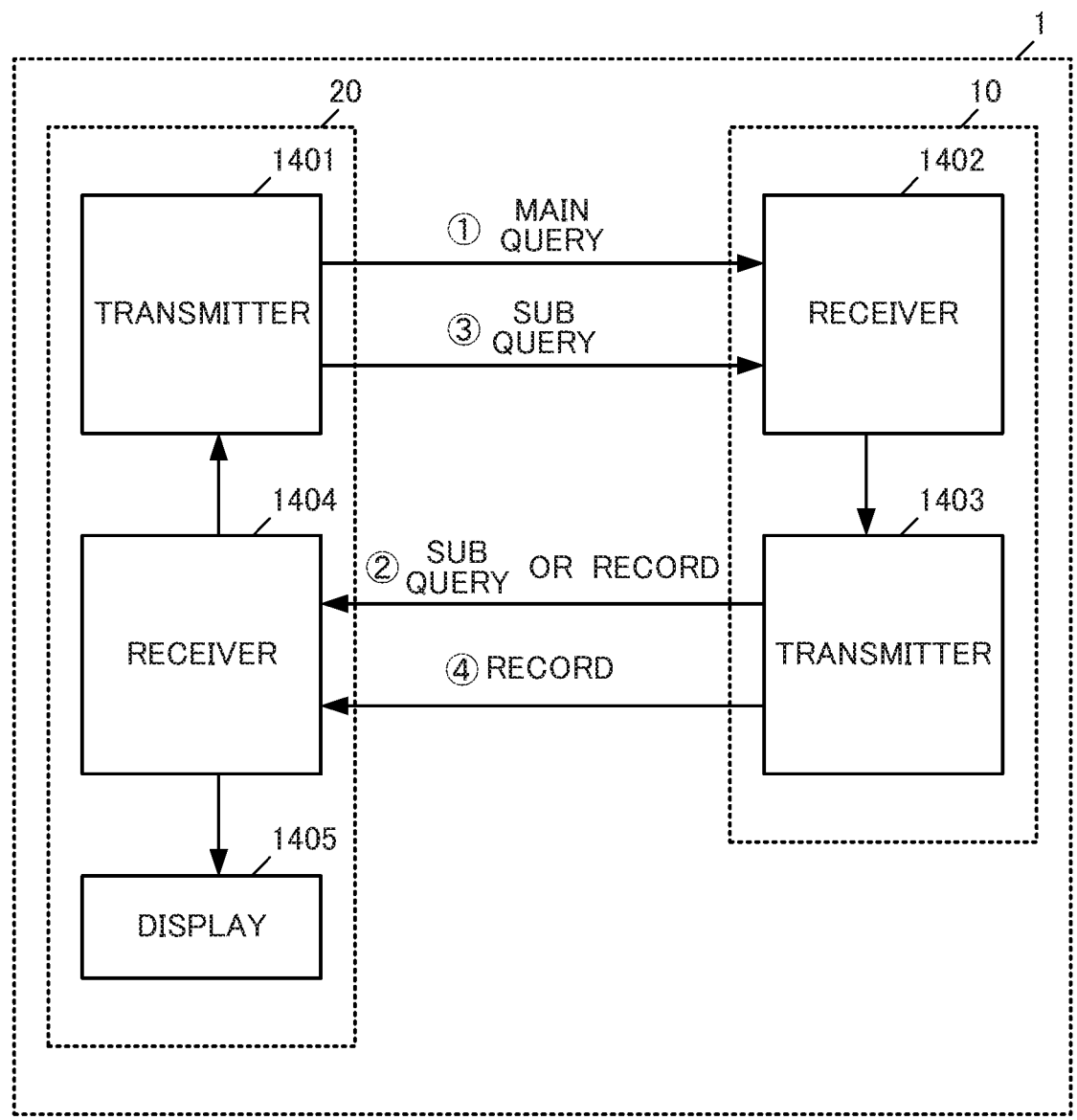
FIG. 14 is a diagram illustrating a functional configuration of an information processing system.

Next, a functional configuration of the information processing system 1 will be described using FIG. 14.

A first transmitter 1401 transmits a main query 600, or sub queries 700 received from the information processing server 10, to the information processing server 10. In the case of transmitting sub queries 700, the first transmitter 1401 transmits the sub queries 700 in an order configured by the information processing server 10. The controller 507 and the communication module 501 of the seller terminal 20 cooperate to function as the first transmitter 1401.

A first receiver 1402 receives a main query 600 or a sub query 700 from the information processing server 10. The controller 203 and the communication module 202 of the information processing server 10 cooperate to function as the first receiver 1402.

A second transmitter 1403 transmits a sub query 700 obtained by splitting a main query 600 on the basis of a sort condition, records indicating the search results from a main query 600, or records indicating the search results from a sub query 700, to the seller terminal 20. Every time a sub query 700 is received from the seller terminal 20, the order list database 252 is searched for records satisfying that sub query 700, and the second transmitter 1403 transmits the records obtained by search to the seller terminal 20. The controller 203, the storage 201, and the communication module 202 of the information processing server 10 cooperate to function as the second transmitter 1403.

A second receiver 1404 receives a sub query 700, records indicating search results from a main query 600, or records indicating search results from a sub query 700, from the information processing server 10. The controller 507 and the communication module 501 of the seller terminal 20 cooperate to function as the second receiver 1404.

A display 1405 displays records indicating search results received by the second receiver 1404 on the display 551 in a configured order. The controller 507 and the image processor 502 of the seller terminal 20 cooperate to function as the display 1405.

Next, a flow of a search process according to the present embodiment will be described using the flowchart in FIG. 15. The present embodiment supposes that the sorting of records according to a sort condition is conducted by the information processing server 10.

First, the controller 507 of the seller terminal 20 displays the screen illustrated in FIG. 8, and accepts the input of a search condition and a sort condition from the user (step S1501). The user specifies a search condition and a sort condition.

The controller 507 of the seller terminal 20 generates a main query 600 that includes the search condition and the sort condition specified by the user (step S1502), and transmits the generated main query 600 to the information processing server 10 (step S1503).

The controller 203 of the information processing server 10 receives the main query 600 from the seller terminal 20 (step S1504).

The controller 203 of the information processing server 10 registers the received main query 600 in a FIFO buffer called a queue. The controller 203 sequentially executes various queries registered in the queue.

The controller 203 of the information processing server 10 determines whether or not the split condition is satisfied at the time of retrieving the main query 600 from the queue (step S1505).

If the split condition is not satisfied (step S1505; No), steps S1701 to S1704 discussed later are executed.

On the other hand, if the split condition is satisfied (step S1505; Yes), the controller 203 of the information processing server 10 splits the main query 600 into multiple sub queries 700 on the basis of the sort condition included in the main query 600 (step S1506). Note that, as discussed earlier, an order of execution is configured for the generated sub queries 700.

The controller 203 of the information processing server 10 transmits data indicating the generated sub queries 700 to the seller terminal 20 (step S1507). The controller 203 deletes the main query 600 from the queue. The controller 507 of the seller terminal 20 receives the data indicating the sub queries 700 from the information processing server 10 (step S1508).

The controller 507 of the seller terminal 20 transmits the sub query 700 ordered first among the received sub queries 700 to the information processing server 10 (step S1509).

The controller 203 of the information processing server 10 receives the first sub query 700 (step S1510), and registers the received sub query 700 in the queue.

The controller 203 sequentially executes various queries registered in the queue. The controller 203 reads out and executes the sub query 700 from the queue (step S1511). In other words, the controller 203 searches the order list database 252 according to the specified search condition, and sorts acquired records according to the specified sort condition.

Note that the queue in which the main query 600 is registered and the queue in which the sub queries 700 are registered is the same.

If the seller terminal 20 is configured to conduct sorting, the controller 203 of the information processing server 10 may also not sort acquired records.

The controller 203 of the information processing server 10 transmits search results to the seller terminal 20 (step S1512). Subsequently, the controller 203 deletes the executed sub query 700 from the queue.

The controller 507 of the seller terminal 20 receives search results from the information processing server 10 (step S1513), and displays the received search results on the display 551 (step S1514).

At this point, a portion of the search results that would have been obtained if the main query 600 had been executed are displayed. Additionally, that portion of search results that are displayed are the records that would be displayed first when sorting the records obtained by executing the main query 600 on the basis of the sort condition. Consequently, the user's viewing of search results is minimally affected.

The controller 507 of the seller terminal 20 transmits the next sub query 700 in the configured order to the information processing server 10 (step S1601).

The controller 203 of the information processing server 10 receives the sub query 700 (step S1602), and registers the received sub query 700 in the queue. The controller 203 retrieves and executes the sub query 700 from the queue (step S1603). In other words, the controller 203 searches the order list database 252 according to the specified search condition, and sorts acquired records according to the specified sort condition.

The controller 203 of the information processing server 10 transmits search results to the seller terminal 20 (step S1604). Subsequently, the controller 203 deletes the executed sub query 700 from the queue.

The controller 507 of the seller terminal 20 receives search results from the information processing server 10 (step S1605), and displays the received search results on the display 551 (step S1606).

As discussed above, the controller 507 of the seller terminal 20 adds the records 1200 searched by the search condition included in the sub query 700 that is second in the configured order to the end of the records 1100 searched by the search condition included in the sub query 700 that is first in the configured order.

The controller 507 of the seller terminal 20 determines whether or not all sub queries 700 received in step S1508 have been executed, or in other words, determines whether or not search results have been obtained for all sub queries 700 (step S1607).

If all sub queries 700 have been executed (step S1607; Yes), the search process ends. The same search results as in the case of executing the main query 600 are displayed on the display 551 of the seller terminal 20.

If there is still a sub query 700 that has not been executed (step S1607; No), the sub query 700 ordered third is transmitted to the information processing server 10 (step S1601). After that, the steps from S 1602 to S1607 are repeated. In this way, search results are displayed for the sub query 700 ordered third and all subsequent sub queries 700.

Figure 15:
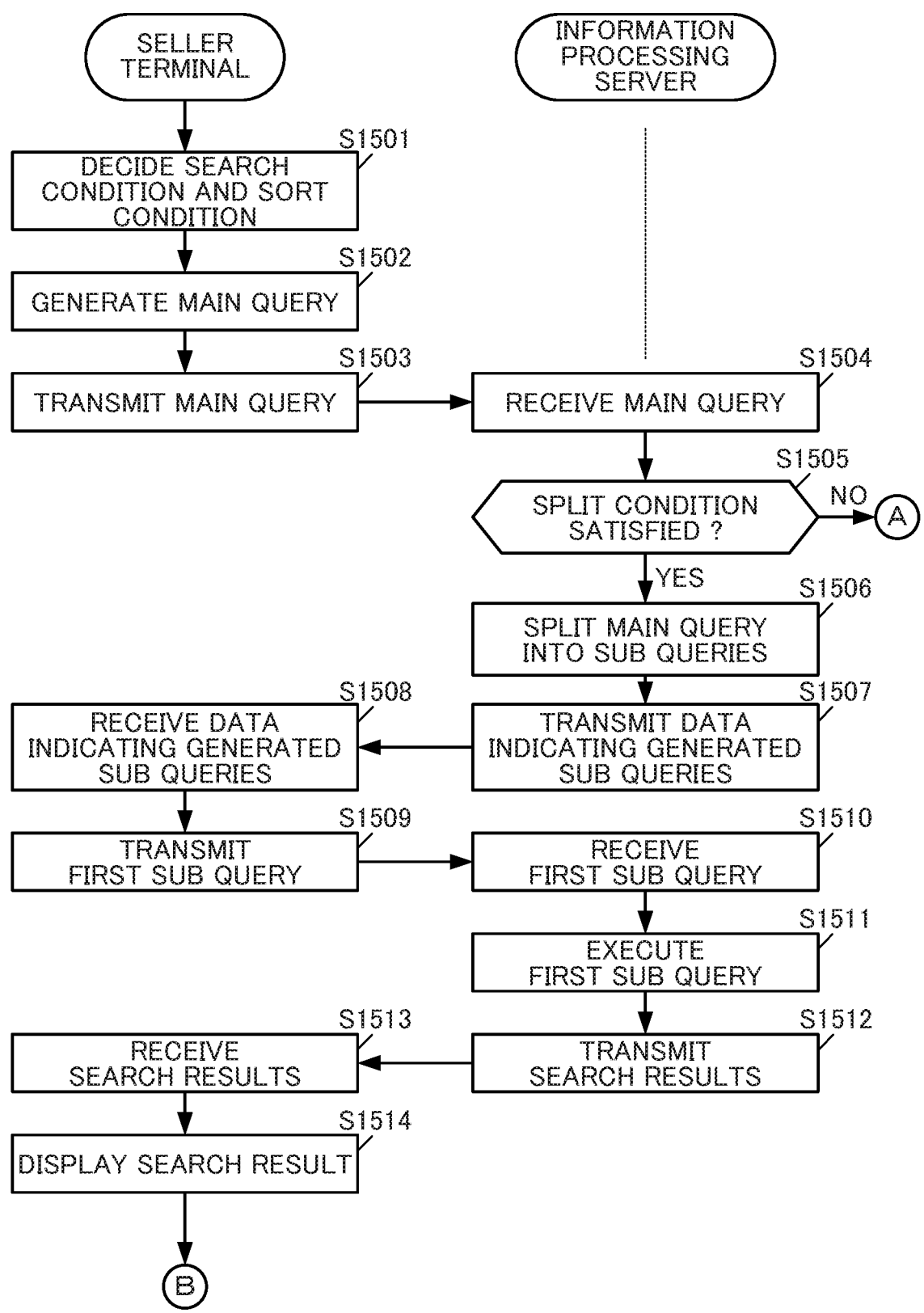
FIG. 15 is a flowchart for describing a flow of a search process according to Embodiment 1.

Meanwhile, in step S1505 of FIG. 15, if it is determined that the split condition is not satisfied (step S1505; No), the controller 203 of the information processing server 10 executes the main query 600 without splitting the main query 600 (step S1701).

The controller 203 of the information processing server 10 transmits search results for the main query 600 to the seller terminal 20 (step S1702). The controller 203 deletes the executed main query 600 from the queue.

Next, the controller 507 of the seller terminal 20 receives the search results for the main query 600 from the information processing server 10 (step S1703), and displays the received search results (step S1704).

According to the present embodiment, the information processing system 1 appropriately distributes processing according to the load conditions. If the split condition is satisfied, the main query 600 is not executed as-is, and instead multiple sub queries 700 obtained by splitting the main query 600 are executed one at a time. If the split condition is not satisfied, the main query 600 is executed.

For example, according to a technique of the related art, if there is high utilization of hardware resources such as the CPU and hard disk of the information processing server 10, there is a possibility that the database may become slower, and the response of the information processing system 1 may become slower. Also, if a search returns a large number of records, it is anticipated that the process of sorting according to the sort condition will become intensive, and the response of the information processing system 1 may become slower. Accordingly, in the present embodiment, a query is split and executed according to the usage conditions of the information processing server 10, thereby distributing the load and improving the user experience.

(Embodiment 2)

Next, another embodiment will be described. The present embodiment differs from the foregoing embodiment in that the information processing server 10 generates the sub queries 700, executes the sub query 700 ordered first, and transmits search results for the sub query 700 ordered first, together with the sub query 700 ordered second and subsequent remaining sub queries 700, to the seller terminal 20.

Figure 18:
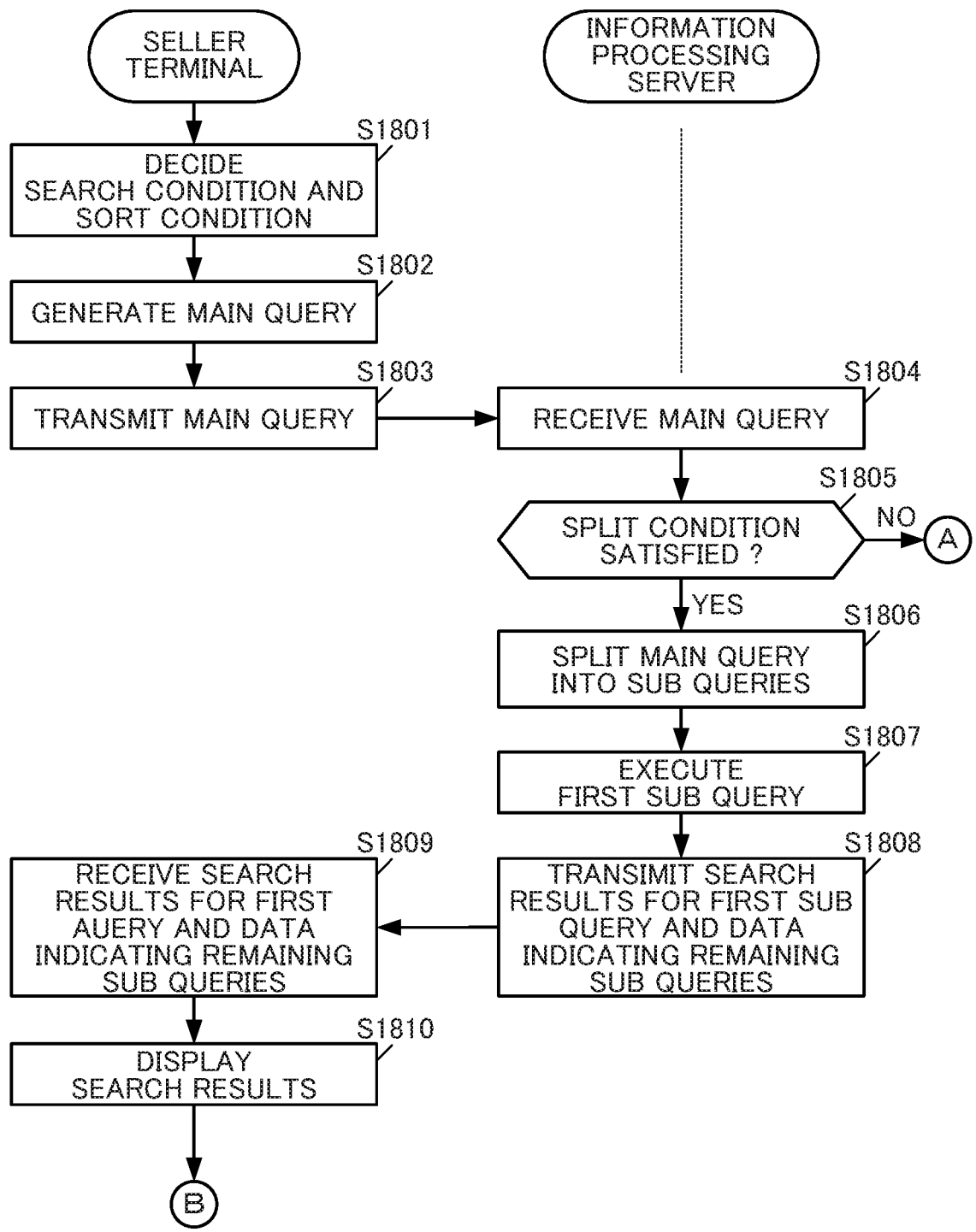
FIG. 18 is a flowchart for describing a flow of a search process according to Embodiment 2.

FIG. 18 illustrates a flow of a search process according to the present embodiment. Note that since the steps from S1801 to S1806 are the same as the steps from S1501 to S1506 in the foregoing embodiment, description will be omitted.

After the main query 600 is split into multiple sub queries 700 in step S1806, the controller 203 of the information processing server 10 executes the sub query 700 ordered first (for example, the first sub query 700A in FIG. 7) (step S1807).

The controller 203 of the information processing server 10 transmits search results for the sub query 700 ordered first, together with data indicating the remaining sub queries 700, to the seller terminal 20 (step S1808). The controller 203 deletes the main query 600 from the queue.

The controller 507 of the seller terminal 20 receives the search results for the sub query 700 ordered first, together with the data indicating the remaining sub queries 700, from the seller terminal 20 (step S1809), and displays the received search results on the display 551 (step S1810).

In other words, in the present embodiment, the seller terminal 20 may not transmit the sub query 700 ordered first to the information processing server 10.

Figure 16:
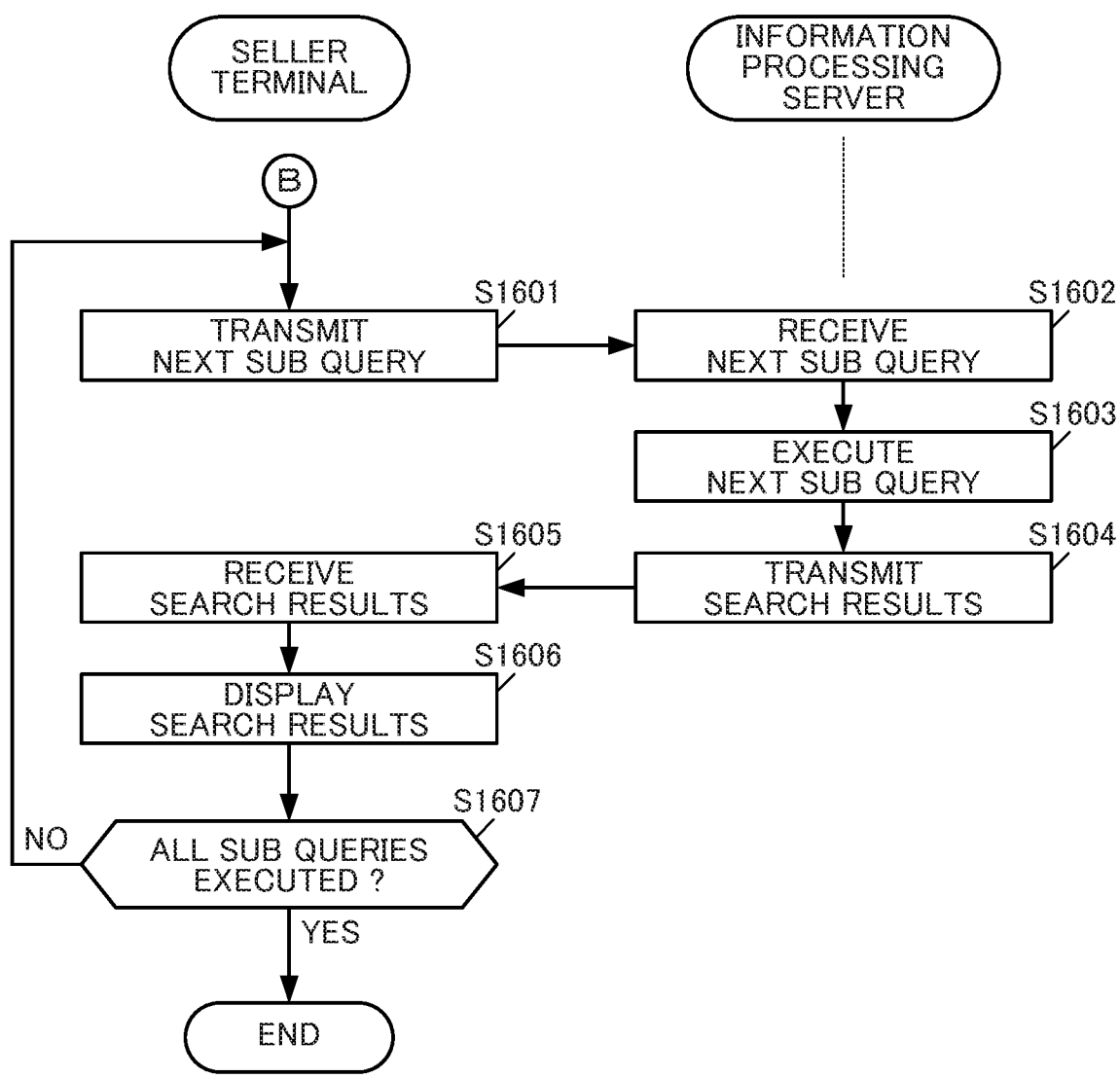
FIG. 16 is a continuation of a flowchart for describing a flow of a search process.

Since the execution sequence and search results display sequence for the second and subsequent sub queries 700 after displaying the search results for the sub query 700 ordered first are the same as in FIG. 16 discussed earlier, description will be omitted. Also, since the processing sequence when the split condition is not satisfied (step S1805; No) is the same as in FIG. 17 discussed earlier, description will be omitted.

According to the present embodiment, it is possible to distribute a load and improve the user experience.

(Embodiment 3)

Next, another embodiment will be described. The present embodiment differs from the foregoing embodiments in that the seller terminal 20, and not the information processing server 10, determines whether or not the split condition is satisfied. Note that the present embodiment supposes that the sorting of records according to a sort condition is conducted by the seller terminal 20.

Figure 19:
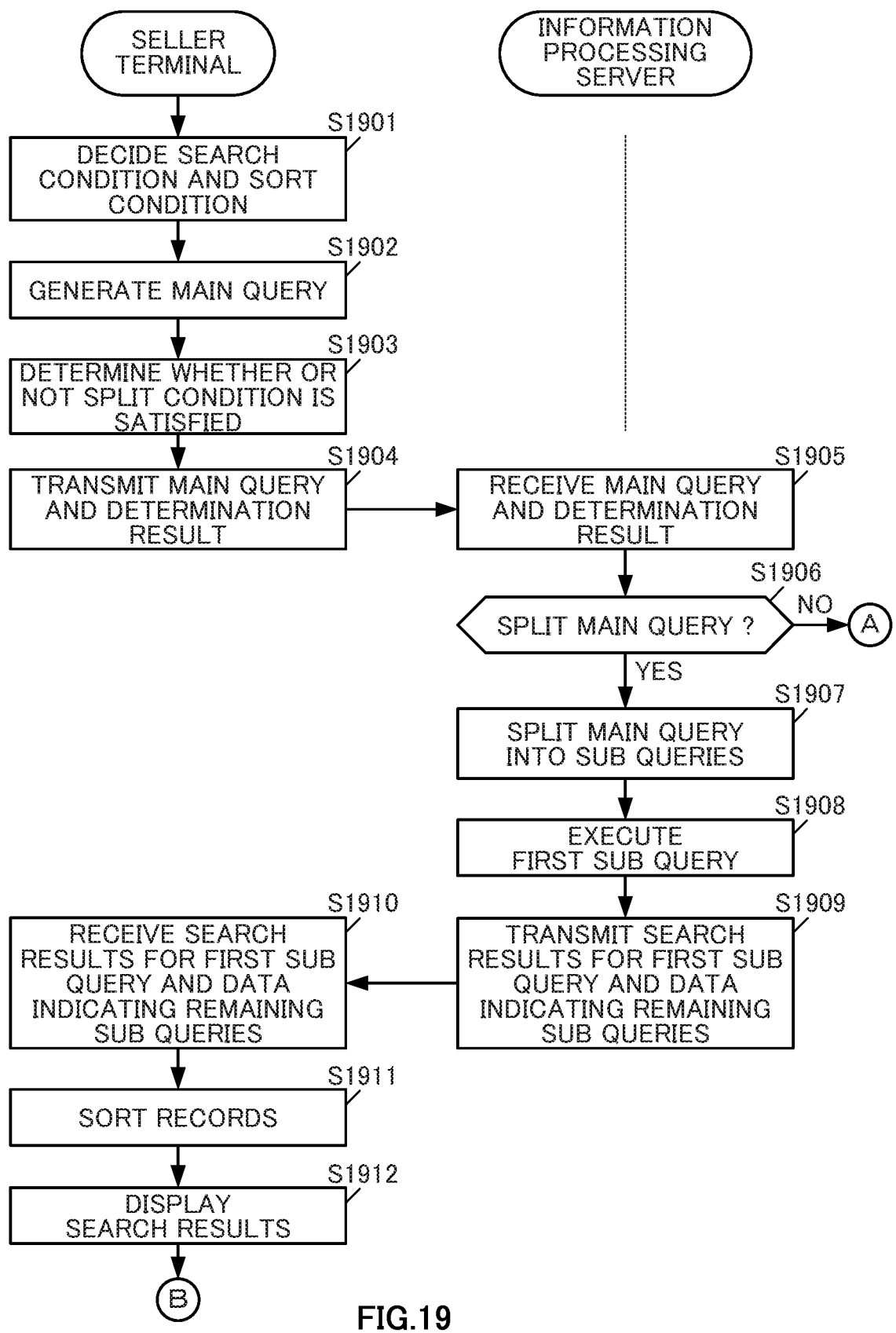
FIG. 19 is a flowchart for describing a flow of a search process according to Embodiment 3.

FIG. 19 illustrates a flow of a search process according to the present embodiment.

First, the controller 507 of the seller terminal 20 displays the screen illustrated in FIG. 8, and accepts the input of a search condition and a sort condition from the user (step S1901). The user specifies a search condition and a sort condition.

The controller 507 of the seller terminal 20 generates a main query 600 that includes the search condition and the sort condition specified by the user (step S1902).

The controller 507 of the seller terminal 20 determines whether or not the split condition is satisfied (step S1903).

The split condition is "the size of the load from all processes currently being conducted by the seller terminal 20 is equal to or greater than a threshold value". The size of a processing load currently being conducted by the seller terminal 20 is typically expressed as a utilization rate of hardware resources such as a CPU provided in the seller terminal 20. If the utilization rate of a CPU provided in the seller terminal 20 at the time of generating a main query 600 is equal to or greater than a threshold value (for example, equal to or greater than 50%), the controller 507 determines to split the main query 600. If the CPU utilization rate is less than the threshold value (for example, less than 50%), the controller 507 determines to not split the main query 600.

The split condition may also be "the performance of hardware resources included in the seller terminal 20 is less than or equal to a predetermined value". Specifically, the CPU processing speed may be less than or equal to a predetermined value, or the RAM capacity may be less than or equal to a predetermined value, for example.

The controller 507 of the seller terminal 20 transmits the main query 600 generated in step S1902, and a determination result indicating whether or not the split condition is satisfied, which was determined in step S1903, to the information processing server 10 (step S1904).

The controller 203 of the information processing server 10 receives the main query 600 and the determination result from the seller terminal 20 (step S1905).

The controller 203 of the information processing server 10 registers the received main query 600 in the queue. The controller 203 retrieves the main query 600 from the queue, and on the basis of the received determination result, determines whether or not to split the main query 600 (step S1906).

In the case of determining to split the main query 600 (step S1906; Yes), the controller 203 of the information processing server 10 splits the main query 600 into multiple sub queries 700 (step S1907).

The controller 203 of the information processing server 10 executes the sub query 700 ordered first (for example, the first sub query 700A in FIG. 7) (step S1908).

The controller 203 of the information processing server 10 transmits search results for the sub query 700 ordered first, together with data indicating the remaining sub queries 700, to the seller terminal 20 (step S1909). The controller 203 deletes the main query 600 from the queue.

The controller 507 of the seller terminal 20 receives the search results for the sub query 700 ordered first, together with the data indicating the remaining sub queries 700, from the seller terminal 20 (step S1910), sorts the records included in the received search results on the basis of the sort condition (step S1911), and displays the search results on the display 551 (step S1912).

Note that since the execution sequence and search results display sequence for the second and subsequent sub queries 700 after displaying the search results for the sub query 700 ordered first are the same as in FIG. 16 discussed earlier, description will be omitted. Also, since the processing sequence when the split condition is not satisfied (step S1805; No) is the same as in FIG. 17 discussed earlier, description will be omitted.

According to the present embodiment, it is possible to distribute a load and improve the user experience. If the seller terminal 20, and not the information processing server 10, is configured to conduct sorting according to a sort condition, according to a technique of the related art, since there are differences in factors such as the CPU processing speed for each individual seller terminal 20, the user of a seller terminal 20 with hardware resources of comparatively low performance may feel a greater sense of dissatisfaction. Consequently, in the present embodiment, a query is split and executed according to the performance of the seller terminal 20 to be used, thereby distributing the load and improving the user experience.

(Embodiment 4)

Next, another embodiment will be described. The information processing server 10 may be configured to determine whether or not a split condition is satisfied, even in the case in which the split condition is defined on the basis of hardware resources included in the seller terminal 20 as in Embodiment 3.

In the present embodiment, the controller 507 of the seller terminal 20 collects properties information about the properties of the seller terminal 20 in advance, and stores the properties information in the storage 506. Subsequently, the controller 507 transmits the properties information to the information processing server 10 at the timing of first activating the search screen illustrated in FIG. 8, for example, the timing of receiving an instruction from the user, or the timing of receiving a transmission request from the information processing server 10. Subsequently, the controller 203 of the information processing server 10 receives the properties information, and stores the properties information in the storage 201, in association with identification information unique to the seller terminal 20.

FIG. 20 illustrates an example of a properties table 2000 stored in the storage 201. In the properties table 2000, properties related to hardware resources of the seller terminal 20, such as the CPU processing speed of the seller terminal 20 (in units of megahertz) and the RAM capacity of the seller terminal 20 (in units of megabytes), are stored in association with identification information unique to the seller terminal 20.

The controller 203 of the information processing server 10 receives a main query 600 and identification information unique to the seller terminal 20 from the seller terminal 20, reads out a record corresponding to the received identification information from the properties table 2000, and acquires properties information.

Subsequently, the controller 203 of the information processing server 10, on the basis of the acquired properties information, determines whether or not to split the main query 600 into sub queries 700.

For example, provided that the split condition is "the CPU clock speed is less than a threshold value", if a main query 600 is received from a seller terminal 20 whose CPU clock speed is less than the threshold value, the controller 203 of the information processing server 10 splits the main query 600 into sub queries 700, whereas if a main query 600 is received from a seller terminal 20 whose CPU clock speed is equal to or greater than the threshold value, the controller 203 of the information processing server 10 executes the main query 600 without splitting.

For example, provided that the split condition is "the RAM capacity is less than a threshold value", if a main query 600 is received from a seller terminal 20 whose RAM capacity is less than the threshold value, the controller 203 of the information processing server 10 splits the main query 600 into sub queries 700, whereas if a main query 600 is received from a seller terminal 20 whose RAM capacity is equal to or greater than the threshold value, the controller 203 of the information processing server 10 executes the main query 600 without splitting.

The properties table 2000 may also store data indicating information such as a time slot during which the seller terminal 20 is primarily used by the user (for example, the business hours of a store), a time slot during which the utilization rate of the seller terminal 20 was comparatively high within a predetermined period, or a time slot arbitrarily specified by the user.

For example, provided that the split condition is "the time of receiving a main query 600 is included in a specified time slot", if a main query 600 is received from a seller terminal 20 at a time included in the specified time slot, the controller 203 of the information processing server 10 splits the main query 600 into sub queries 700, whereas if a main query 600 is received from a seller terminal 20 at a time not included in the specified time slot, the controller 203 of the information processing server 10 executes the main query 600 without splitting.

Conversely, the split condition may also be "the time of receiving a main query 600 is not included in a specified time slot".

The properties table 2000 may also store a user-specified value indicating whether or not to split the main query 600, in association with identification information unique to the seller terminal 20.

For example, provided that the split condition is "a main query 600 is received from a pre-specified seller terminal 20 for which to split the main query 600", if a main query 600 is received from a pre-specified seller terminal 20, the controller 203 of the information processing server 10 splits the main query 600 into sub queries 700, whereas otherwise, the controller 203 of the information processing server 10 executes the main query 600 without splitting.

Figure 17:
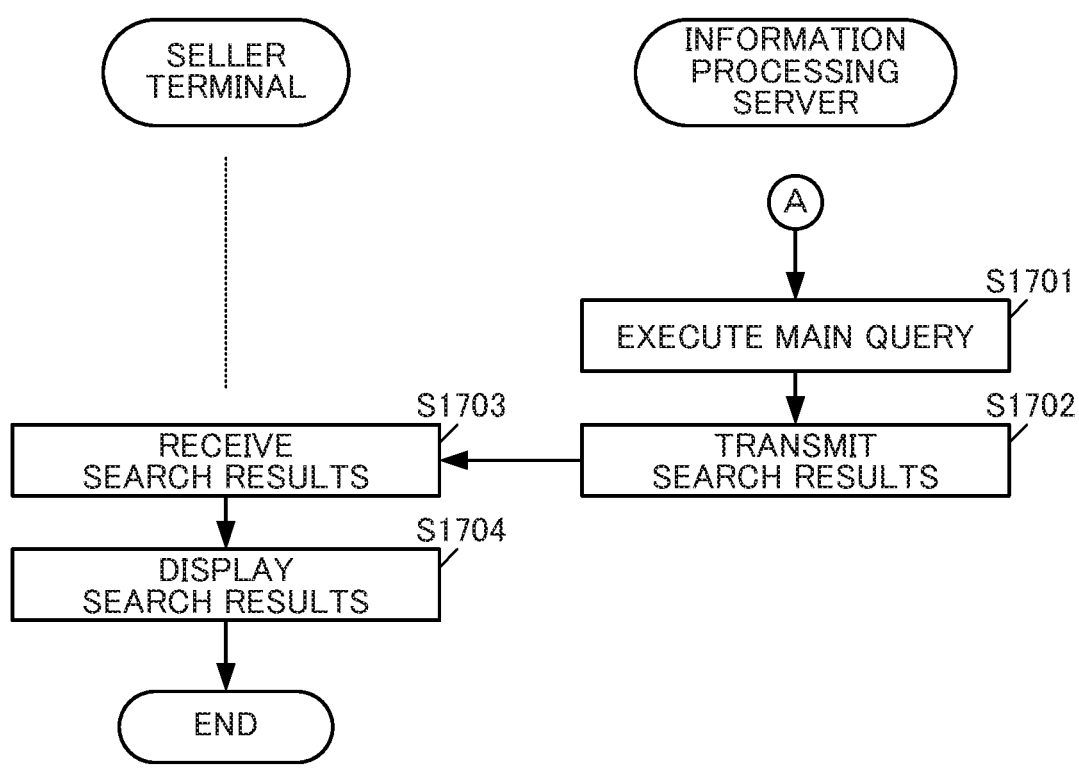
FIG. 17 is a continuation of a flowchart for describing a flow of a search process.

Note that the flow of a search process is similar to the flows illustrated in FIGS. 15, 16, and 17 discussed earlier.

According to the present embodiment, it is possible to distribute a load according to the performance of the seller terminal 20 and improve the user experience.

The present disclosure is not limited to the foregoing embodiments, and various modification and applications are possible. Moreover, it is also possible to freely combine the respective structural elements of the foregoing embodiments.

A program for causing a computer to operate as some or all of the information processing system 1 may be distributed by being stored on a computer-readable recording medium such as a memory card, a CD (Compact Disc), a DVD (Digital Versatile Disk), or a MO (Magneto Optical disk). Such a program may be installed on a separate computer and cause operation of the functions discussed earlier, or cause execution of the process steps discussed earlier.

Furthermore, a program may be stored on a disk device or the like included in a server on the Internet, in which the program is modulated onto a carrier wave and downloaded or the like to a computer, for example.

According to the present disclosure, it is possible to provide an information processing system, a terminal, a server, an information processing method, a recording medium, and a program suitable for distributing a load related to sorting and improving the user experience.

REFERENCE SIGNS LIST 1 information processing system
10 information processing server
20, 20A, 20B, 20C seller terminal
30, 30A, 30B, 30C buyer terminal
50 communication network
201 storage
202 communication module
203 controller
251 product database
252 order list database
501 communication module
502 image processor
503 audio processor
504 I/O module
505 input device
506 storage
507 controller
551 display
552 speaker
553 microphone
600 main query
700, 700A, 700B, 700C, 700D sub query
1401 first transmitter
1402 first receiver
1403 second transmitter
1404 second receiver
1405 display
2000 properties table

The invention claimed is:

1. An information processing system comprising:
a terminal, wherein the terminal is configured to:
transmit a main query to the server, wherein the main query is associated with a sort condition,
receive a plurality of subqueries from the server, wherein:
i) the subqueries are based on the main query, ii) the plurality of subqueries includes a first subquery and a second subquery, and iii) an order is associated with the plurality of subqueries,
based on the order:
transmit the first subquery to the server,
receive a first record from the server,
transmit the second subquery to the server,
receive a second record from the server, and
display the first record and the second record; and
a server configured to:
receive the main query from the terminal,
split the main query into the plurality of subqueries in the order, wherein the server is configured to perform the split based on the sort condition,
transmit the plurality of subqueries to the terminal,
receive the first subquery from the terminal,
search for a first record satisfying the first subquery,
transmit to the terminal the first record,
receive the second subquery from the terminal,
search for a second record satisfying the second subquery, and
transmit to the terminal the second record.

2. The information processing system according to claim 1, wherein
the server is further configured to determine a number of the plurality of subqueries on the basis of a load on the server.

3. The information processing system according to claim 1, wherein
the server is further configured to determine a number of the plurality of subqueries on the basis of a number of records satisfying the main query.

4. The information processing system according to claim 1, wherein the server is further configured to sort the first record and the second record according to the sort condition.

5. The information processing system according to claim 1, wherein the terminal is further configured to sort the first record and the second record according to the sort condition.

6. The information processing system according to claim 1, wherein:
the terminal is further configured to:
produce a positive determination result based on a processing load exceeding a threshold value, and
provide the positive determination result to the server; and
the server is further configured to:
receive the positive determination result, and
split the main query based on the positive determination result.

7. The information processing system according to claim 1, wherein the server is further configured to split the main query by equally splitting a search condition included in the main query.

8. The information processing system according to claim 1, wherein the server is further configured to split the main query by increasing a number of subdivisions in response to a large number of orders for a product.

9. The information processing system according to claim 1, wherein:
the search condition includes a condition specifying a range of time; and
the server is further configured to split the main query by increasing a number of subdivisions based on the range of time.

10. A server comprising:
at least one memory to store computer program code; and
a controller comprising at least one processor, wherein the at least one processor is configured to access said at least one memory and operate according to said program code, said program code including:
receive code causing said at least one processor to receive a main query from a terminal;
first query code causing said at least one processor to, when a number of records satisfying the main query is equal to or greater than a threshold value:
split the main query into a plurality of subqueries in an order based on a sort condition,
transmit the plurality of subqueries to the terminal,
receive the subqueries from the terminal in the order,
search for first records satisfying a first subquery of the plurality of subqueries, and
transmit the first records to the terminal; and
second query code causing said at least one processor to, when the number of records satisfying the main query is less than the threshold value:
transmit second records satisfying the main query to the terminal.

* * * * *